US 8,004,536 B2

(12) United States Patent
Wilensky

(10) Patent No.: US 8,004,536 B2
(45) Date of Patent: Aug. 23, 2011

(54) COHERENT IMAGE SELECTION AND MODIFICATION

(75) Inventor: Gregg D. Wilensky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 867 days.

(21) Appl. No.: 11/633,062

(22) Filed: Dec. 1, 2006

(65) Prior Publication Data

US 2008/0131010 A1 Jun. 5, 2008

(51) Int. Cl.
*G09G 5/02* (2006.01)

(52) U.S. Cl. ........ 345/589; 345/593; 345/594; 382/164; 382/173

(58) Field of Classification Search .......... 345/589–605; 382/164

See application file for complete search history.

(56) References Cited

U.S. PATENT DOCUMENTS

| | | | | |
|---|---|---|---|---|
| 5,710,830 | A * | 1/1998 | Holeva | 382/173 |
| 5,768,413 | A * | 6/1998 | Levin et al. | 382/173 |
| 5,771,308 | A * | 6/1998 | Florent | 382/130 |
| 6,167,167 | A * | 12/2000 | Matsugu et al. | 382/283 |
| 6,256,411 | B1 * | 7/2001 | Iida | 382/203 |
| 6,337,925 | B1 | 1/2002 | Cohen | |
| 6,400,831 | B2 | 6/2002 | Lee et al. | |
| 6,456,297 | B1 | 9/2002 | Wilensky | |
| 6,546,117 | B1 * | 4/2003 | Sun et al. | 382/103 |
| 6,674,955 | B2 | 1/2004 | Matsui et al. | |
| 6,778,690 | B1 * | 8/2004 | Ladak et al. | 382/131 |
| 6,983,081 | B2 * | 1/2006 | Chen | 382/284 |
| 7,024,039 | B2 * | 4/2006 | Simard et al. | 382/195 |
| 7,245,766 | B2 * | 7/2007 | Brown et al. | 382/199 |
| 7,400,767 | B2 * | 7/2008 | Slabaugh et al. | 382/173 |
| 7,430,339 | B2 * | 9/2008 | Rother et al. | 382/284 |
| 2002/0118875 | A1 | 8/2002 | Wilensky | |
| 2002/0130908 | A1 | 9/2002 | Wilensky | |
| 2002/0136453 | A1 | 9/2002 | Aggarwal et al. | |

(Continued)

FOREIGN PATENT DOCUMENTS

EP 1720128 A2 11/2006

(Continued)

OTHER PUBLICATIONS

"International Application Serial No. PCT/US2007/085244, International Search Report and Written Opinion mailed Mar. 4, 2009", 12 pgs.

(Continued)

*Primary Examiner* — Xiao M Wu
*Assistant Examiner* — Charles Tseng
(74) *Attorney, Agent, or Firm* — Schwegman, Lundberg & Woessner, P.A.

(57) ABSTRACT

An example method includes receiving a first selection location and at least one selection parameter with respect to digital data. A portion of the digital data is selected relative to the first selection location. The selecting of the portion includes assigning an energy value to each pixel within a selection proximity of the selection location. The selection proximity is determined based on the selection parameter and the energy value being a function of distance from the selection location. The selecting of the portion further includes generating a selection value for each pixel within the selection proximity, based on the assigned energy value and on a pixel characteristic difference between the relevant pixel and at least one neighboring pixel. The selection value determines whether the relevant pixel is included in the selected portion of the digital data.

21 Claims, 13 Drawing Sheets

U.S. PATENT DOCUMENTS

| | | | |
|---|---|---|---|
| 2003/0026479 A1* | 2/2003 | Thomas et al. | 382/173 |
| 2003/0099411 A1 | 5/2003 | Kokemohr | |
| 2003/0202697 A1* | 10/2003 | Simard et al. | 382/195 |
| 2003/0202699 A1* | 10/2003 | Simard et al. | 382/195 |
| 2004/0037476 A1* | 2/2004 | Chen | 382/284 |
| 2005/0025320 A1 | 2/2005 | Barry | |
| 2006/0053374 A1 | 3/2006 | Wilensky | |

FOREIGN PATENT DOCUMENTS

| | | |
|---|---|---|
| WO | WO-0186375 A3 | 11/2001 |
| WO | WO-2004031991 A1 | 4/2004 |
| WO | WO-2006028460 A2 | 3/2006 |
| WO | WO-2006028460 A3 | 3/2006 |
| WO | WO-2008070450 A2 | 6/2008 |
| WO | WO-2008070450 A3 | 6/2008 |

OTHER PUBLICATIONS

Tan, K. H, et al., "Selecting Objects with freehand sketches", *Proceedings of the eigt IEEE International Conference on computer vision*; vol. 1, (Jul. 7, 2001), 337-344.

Yahia, H. M, et al., "Fast & robust level-set segmentation of deformable structures", *Acoustics, Speech and signal processing, 1998. Proceedings of the 1998 IEEE International Conference on Seattle*, vol. 5, (May 12, 1998), 2765-2768.

"U.S. Appl. No. 10/984,465 response filed Oct. 15, 2008 to Non-Final Office Action mailed Jun. 23, 2008", 28 pgs.

"U.S. Appl. No. 10/984,465 Final Office Action mailed Dec. 23, 2008", 17 pgs.

"U.S. Appl. No. 10/984,465, Response filed Mar. 23, 2009 to Final Office Action mailed Dec. 23, 2008", 22 pgs.

"U.S. Appl. No. 10/984,465, Response filed Nov. 13, 2009 to Non Final Office Action mailed Jul. 13, 2009", 25 pgs.

"U.S. Appl. No. 10/984,465, Non-Final Office Action mailed Jul. 13, 2009", 16 Pgs.

"International Application Serial No. PCT/USO4/29149, International Search Report mailed Mar. 23, 2006", 4 pgs.

"International Application Serial No. PCT/US04/29149, Written Opinion mailed Mar. 23, 2006", 6 pgs.

-, "U.S. Appl. No. 10/984,465, Non-Final Office Action mailed Jun. 23, 2008", OARn, 18 pgs.

"Adobe Photoshop CS: The New Color Replacement Tool", *The National Association of Photoshop Professionals*, (2004),1-4.

"At a Glance", *Adobe Photoshop CS with Adobe ImageReady CS*, (2003),1-2.

"Color Replacement: Photoshop CS", *PSDesignsv.3.0 Heathrowe.com*, 1-4.

"Digital Photography Review", *Adobe Photshop CS Review p. 1 Operation*, (Sep. 2003),1-3.

"Digital Photography Review", *Adobe Photshop CS Review p. 2 Operation*, 1-3.

"Digital Photography Review", *Adobe Photshop CS Review p. 3 Operation*, 1-3.

"Digital Photography Review", *Adobe Photshop CS Review p. 4 Operation*, 1-3.

"Entensis Mask Pro 3 Users Guide", (2003),1-53.

"Evaluation Guide", *Extensis, Mask Pro 3, Unmatched Masking Power and Precision*, (2003),1-29.

"Getting Started with Adobe Photoshop 6.0", *ITS Training, Short Course*, (Sep. 27, 2001),1-18.

"How to Fix Red Eye", *Adobe Photoshop CS with Adobe ImageReady CS*, Adoce Photoshop CS Help,1.

"Image Enhancement—Understanding the Basics of Photoshop", *UPENN, Department of City & RegionalPlanning, Planning Support System*, Fall 2003, 1-24.

"Photoshop—Layer Basics", *Adobe Photoshop*, 1-8.

"The Professional Standard in Desktop Digital Imaging", *Adobe Photoshop cs, Features*, (Sep. 2003),1-6

"Unmatched Masking Power & Precision", *Extensis Masko Pro 3; more Control and Precision for Unmatched Masking Results*, (2003),1.

"Using Layer Comps", *Adobe Photoshop CS*, Tutorial,(2003),1-2.

"Using the Color Replacement Tool", 1-2.

"Using the Healing Brush tool (Photoshop)", 1-2.

"Working with Selections", *Adobe Photoshop 5.0*, Tutorial excerpted from Adobe Photoshop Classroom in a Book,(1998),1-14.

Boykov, Y , et al., "Interactive graph cuts for optimal boundary & region segmentation of objects in N-D images", *Eighth IEEE International Conference on Computer Vision, 2001, ICCV 2001, Proceedings.*, (2001),105-112.

Comaniciu, Dorin , et al., "Kernel-Based Object Tracking", *2000 IEEE Conference on Computer Vision and Pattern Recognition.*, 1-30.

Comaniciu, Dorin , et al., "Robust detection and tracking of human faces with an active camera", *Third IEEE International Workshop on Visual Surveillance*, 2000. Proceedings.,11-18.

Comanisiu, Dorin , et al., "Real-Time Tracking of Non-Rigid Objects using Mean Shift", *Proceedings. IEEE Conference on Computer Vision and Pattern Recognition*, 2000.,1-8.

Geman, S , et al., "Stochastic Relaxation, Gibbs Distributions, and the Bayesian Restoration of Images", *IEEE Transactions on Pattern Analysis and Machine Intelligence*, vol. PAMI-6, No. 6, (Nov. 1984),721-741.

Kelby, Scott , "Retouching Tips: Enhancing Eyes, Eyelashed, and More!", *Adobe Photoshop CS, Tutorial*, (2003),1-3.

Kohli, P , et al., "Efficiently solving dynamic Markov random fields using graph cuts", *Tenth IEEE International Conference on Computer Vision*, 2005. ICCV 2005., 922-929.

Lombaert, H , et al., "A multilevel banded graph cuts method for fast image segmentation", *Tenth IEEE International Conference on Computer Vision*, 2005. ICCV 2005., 259-265.

Mortensen, E N., et al., "Interactive segmentation with intelligent scissors", *Graphical Models and Image Processing*, 60, (1998),349-384.

Reese, L J., "Intelligent paint: Region-based interactive image segmentation", *Master's thesis, Brigham Young University*, (1999),1-142.

Rother, Carsten , et al., "GrabCut—Interactive Foreground Extraction using Iterated Graph Cuts", *ACM Transactions on Graphics*, 23(3), (2004),309-314.

Wang, J , et al., "An iterative optimization approach for unified image segmentation and matting", *Tenth IEEE International Conference on Computer Vision*, 2005. ICCV 2005., 936-943.

Wang, A , et al., "On fast FIR filters implemented as tail-canceling IIR filters", *IEEE Transactions on [see also Acoustics, Speech, and Signal Processing, IEEE Transactions on] Signal Processing*, 45(6), (Jun. 1997),1415-1427.

"U.S. Appl. No. 10/984,465, Advisory Action mailed Apr. 3, 2009", 3 pgs.

"U.S. Appl. No. 10/984,465, Final Office Action mailed Feb. 18, 2010", 15 pgs.

"U.S. Appl. No. 11/633,061, Restriction Requirement mailed Feb. 25, 2010", 8 pgs.

"U.S. Appl. No. 11/633,062, Response filed Nov. 18, 2009 to Restriction Requirement mailed Nov. 4, 2009", 13 pgs.

U.S. Appl. No. 10/984,465, Response filed Apr. 19, 2010 to Final Office Action mailed Feb. 18, 2010, 25 pgs.

U.S. Appl. No. 11/633,061, Non-Final Office Action mailed Jun. 23, 2010, 11 pgs.

U.S. Appl. No. 11/633,061, Response to Restriction Requirement mailed Apr. 21, 2010, 15 pgs.

U.S. Appl. No. 11/633,061, Restriction Requirement mailed Apr. 21, 2010, 8 pgs.

"U.S. Appl. No. 11/633,061, Examiner Interview Summary mailed Mar. 10, 2010", 3 pgs.

"U.S. Appl. No. 11/633,061, Non-Final Office Action mailed Dec. 8, 2010", 13 pgs.

"U.S. Appl. No. 11/633,061, Response filed Mar. 12, 2010 to Examiner Interview Summary mailed Mar. 10, 2010", 1 pg.

"U.S. Appl. No. 11/633,061, Response filed Sep. 20, 2010 to Non-Final Office Action mailed Jun. 23, 2010", 16 pgs.

"U.S. Appl. No. 11/633,061, Response filed Mar. 8, 2011 to Final Office Action mailed Dec. 8, 2010", 14 pgs.

\* cited by examiner

COHERENT IMAGE SELECTION AND MODIFICATION

FIELD OF TECHNOLOGY

The present application relates generally to the technical fields of computer graphics processing, operator interface processing, and selective visual display systems and, in one example embodiment, to a method and a system to perform the automated selection (e.g., mask definition) with respect to digital data.

BACKGROUND

The performance of activities (e.g., adjustments, modifications, editing, etc.) related to digital data is facilitated by many existing editing tools. Take, for example, the process of modifying a digital image by a user utilizing an image editing application. The user typically makes global image adjustments (e.g., the overall lighting and color balance of the global image is modified), whereafter the user may modify local regions of the digital image. After a global adjustment, has been made, one object (or feature) of the image may be too dark and need to be lightened. A face of a person appearing in the digital image may be too saturated, or the user may desire to change the color hue of a flower, for example, from red to pink or purple. To make such local adjustments typically requires a two-step process. First, the user makes a selection of the relevant object, utilizing or more selection (or segmentation) tools, and then applies an image adjustment to a selected region of the digital image. In the event that the resultant image is not what the user desires, the user is required to undo the effect and redo the selection. It will be appreciated that this may be a somewhat slow and tedious process. Further, the region selection process (e.g., painting the selected region) can be time consuming and inaccurate.

One example of an image editing application is the ADOBE® PHOTOSHOP® image editing application, developed by Adobe Systems Incorporated of San Jose, Calif. The ADOBE® PHOTOSHOP® application provides a feature called the Color Replacement Brush, which allows a user to create and save constant "brushes" with precise settings, including size, shape, tilt, spacing, scatter, jitter, etc. However, once an image region has been brushed, an image modification is fixed, and parameters that went into creating the modification cannot be changed without undoing and redoing the brush stroke. The ADOBE® PHOTOSHOP® application further provides a Replace Color Adjustment feature. This feature is, however, limited to a global color range selection.

The ADOBE® PHOTOSHOP® application further provides so-called "Adjustment Layers," which enable localized adjustment of an image. However, the Adjustment Layers require a user manually to create a selection mask, and the updating of this mask is a multi-step process.

Current methods for the automated (or partially automated) definition of a selection mask may require efficient segmentation on an image, and tended to suffer from a number of technical deficiencies. For example, current selection technologies may inaccurately select objects within an image, or alternatively require a large degree of manual input in order to accurately identify and select an object within an image. Examples of current selection technologies include the "Magic Wand" and "Magnetic Lasso", both present in the ADOBE® PHOTOSHOP® application. The "Magic Wand" technology starts with a user-specified point or region to compute a region of connected pixels, such that all of the selected pixels fall within some adjustable tolerance of the color statistics of the specified region. Determining an acceptable tolerance tends to be difficult for a user. For example, because the distribution of color space of foreground and background pixels may have considerable overlap, satisfactory segmentation may be difficult to achieve utilizing the "Magic Wand" technology.

While the "Magic Wand" technology utilizes texture (or color) information to perform segmentation, the "Magnetic Lasso" technology uses edge (or contrast) information to perform segmentation. For example, a user may be allowed to trace an object's boundary with a mouse. However, often many user interactions are necessary to obtain a satisfactory result.

BRIEF DESCRIPTION OF THE DRAWINGS

The embodiments are provided by way of example and not limitation in the figures of the accompanying drawings, in which like references indicate similar elements and in which.

DETAILED DESCRIPTION

Figure 1:
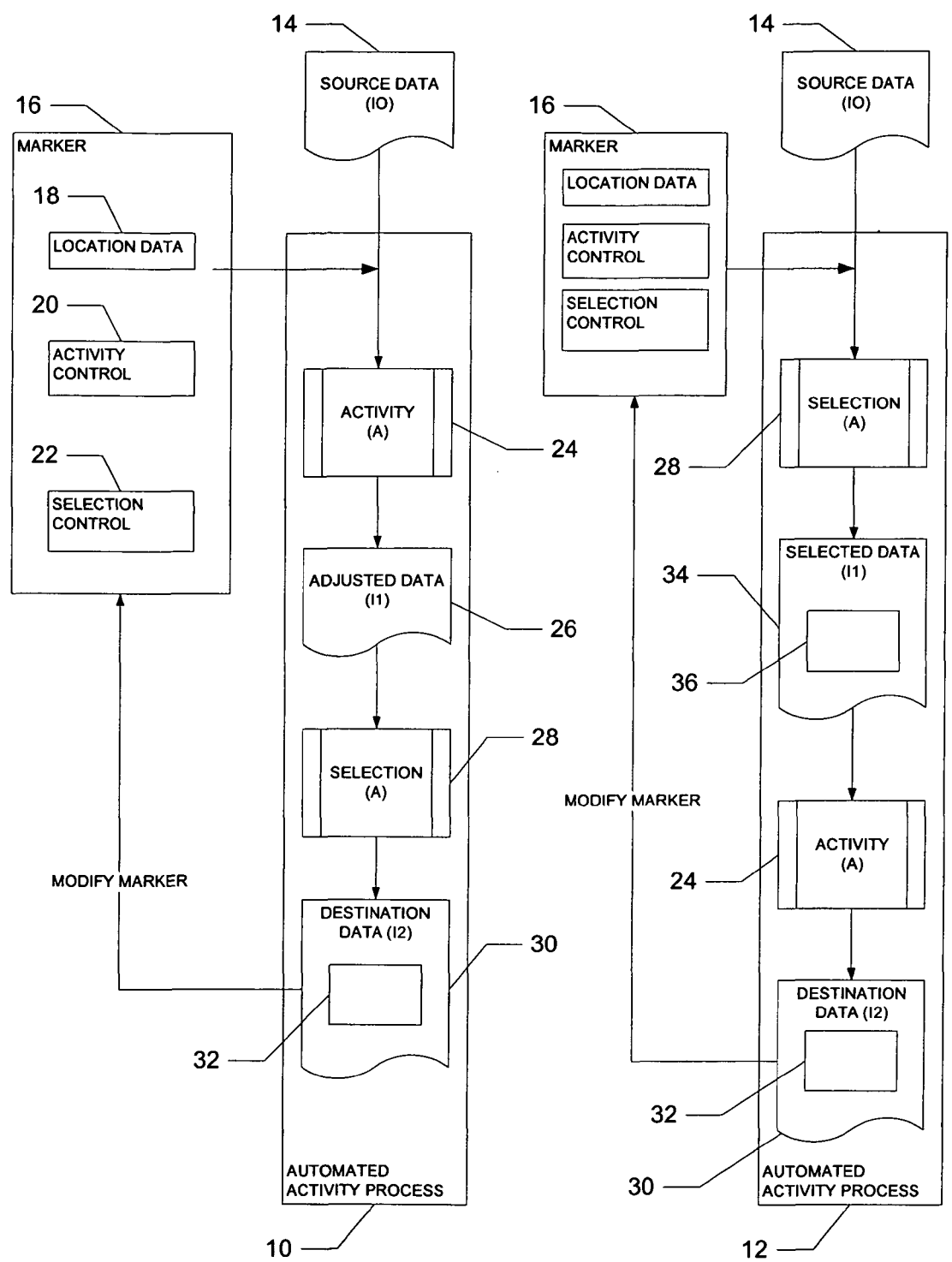
FIG. 1 is a flow diagram, illustrating the performance of an activity, in an example form of an adjustment, to source data in a localized manner to generate destination data, according to two example embodiments.

A method and a system to perform digital data (e.g., image data) segmentation and localized activities with respect to segmented digital data are described. In the following description, for purposes of explanation, numerous specific details are set forth in order to provide a thorough understanding of the described embodiments. It will be evident, however, to one skilled in the art that the present invention may be practiced without these specific details.

An example embodiment seeks to provide a system and method to enable a user to perform segmentation and selection of a portion of source digital data (e.g., vector-based or non-vector based graphics or art), and to perform a multitude of activities (e.g., image adjustments) with respect to the portion of source digital data. The user may have parametric control of both the activity and the segmentation of the source digital data and selection of the portion of the source digital data to which the activity is applied. Further, one example embodiment seeks to provide near real-time feedback (e.g., visual feedback) regarding the results of the parametrically-controlled activity. In other words, the effects of the activity may be communicated or observable by a user in a near real-time manner. Further, an embodiment seeks to enable a user interactively to modify parameters associated with the activity and/or the selection, so as to provide output to the user, in near real-time, showing the effects of such modifications to the activity or selection parameters.

To this end, in one embodiment, a user is able to specify location data, identifying a marker location with respect to the source digital data, utilizing a graphical user interface via which the user can locate an icon (e.g., an activity marker or pin) with respect to the source digital data. The activity marker or pin may have at least two sets of controls associated therewith. A first set of controls provides a selected activity type (e.g., an image adjustment type) and an associated set of activity parameters for the selected activity type. A second set of controls provides for a parametrically-controlled selection of a portion of the source digital data, and has one or more portion selection parameters associated therewith.

In one example embodiment, an effective selection mask is derived from the set of activity markers located relative to the source digital data (e.g., image data). This may be achieved by using each marker to set local energy values for each pixel that lies close to the marker location and within a predetermined area (e.g., sphere, circle or rectangle) of influence. The area of influence may also encompass a full image area. Image data (e.g., color, opacity) values determine a neighbor interaction energy that produces a spatial coherence in the resulting selection. The energy of a particular pixel may also depend on the selection state of that pixel (e.g., selected or not selected). The selection state may be solved through energy minimization with respect to the image data (e.g., by finding that state for pixels in a particular space, which results in the lowest overall energy value). Graph-cut methods may, in one example embodiment, be used to perform energy minimization.

In one example embodiment, the markers are generated automatically. In this embodiment, a "brush tool" is used to mark the image and provide a live interactive coherent selection mask as the user brushes (with a computer mouse for example) over the image. Upon release of the brush (mouse up event), a selection marker is automatically placed on a location in the selection mask. The location is chosen to be close to the centroid of the mask, in a region in which the mask values are high (e.g., indicative of selection of foreground regions).

As noted above, an embodiment seeks to enable the performance of a number of localized activities with respect to source digital data. Accordingly, location data (e.g., associated with one or more activity markers or pins) may allow a user to specify a number of locations with respect to source digital data at which various activities (e.g., selective adjustments) are to be applied. Further, the activity markers may specify both the activity type, and also parametrically control the degree (or extent) of effects that result from the selected activity. For example, the degree (or extent) of activity may be controlled as to locality, both in a coordinate space and a color space, with respect to digital image data.

Further, one embodiment allows a user to modify the controls associated with a particular activity marker or pin and the parametrically-controlled portion of the source digital data, to provide a user with near real-time feedback (e.g., visual or otherwise).

In one embodiment, an activity marker may furthermore have a "polarity" associated therewith, and a user may be enabled to switch a polarity from positive to negative, or vice versa. A "positive" marker, in one embodiment, may identify a portion that positively contributes towards the definition of a selection mask, while a "negative" marker may negatively contribute (or subtract) from a selection mask. Consequently, in one embodiment, combinations of positive and negative markers may be utilized to create a refined composition selection mask, or to refine the portion of the digital data to which the activity is applied.

The activity markers, utilizing an associated collection of selection controls, provide a mechanism for performing segmentation of the source digital and selection of a portion (e.g., region) of the source data, in one embodiment, based on proximity to location data for an activity marker (e.g., a spatial profile of the activity marker). A user, by locating multiple activity markers with respect to source digital data, can specify an accumulation of activities to be performed with the respect to the source digital data, with each of these activities being parametrically localized in accordance with appropriate selection controls associated with each of the activity markers.

Further, in one example embodiment, an activity layer is provided (e.g., as part of a digital data activity application), the activity layer being distinct from the source digital data and operatively serving to modify a representation of the source digital data. As the activity layer is distinct from the source digital data, an activity layer enables a digital data activity application to modify a representation of the source digital data in a non-destructive manner. Further, in one embodiment, a digital data activity application may enable a user to create a multitude of activity layers that may be "superimposed" so as to create an accumulation of parametrically selected portions of a source digital data and/or an accumulation of parametrically-controlled activities with respect to the source digital data.

Certain activity markers, in one example embodiment, may be equipped with sensing logic so as to enable the activity markers to identify certain characteristics of source digital data at locations associated with the activity markers (e.g., at locations on digital image data at which the markers have been placed by a user). The sensing logic may, responsive to the detection of a predetermined characteristic, automatically invoke certain predetermined activities with respect to the selected portion of the source digital data associated with the activity marker. For example, where the source digital data is digital image data, an activity marker may automatically determine whether a location, associated with the marker in the digital image data, is in shadow or in highlight. Depending on this determination, a parametrically-controlled adjustment with respect to a selected portion of the digital image data may be performed.

Further, in one embodiment, a predefined (or default) set of activity markers may furthermore be provided within the context of a digital data activity application, the predefined activity markers including selection and activity controls, and associated parameters, which are pre-configured to perform certain activities. Again, considering an example where the source digital data is digital image data, a "bluer-sky" marker may be defined automatically to enhance the blue color of the sky when placed on a portion of digital image data representing the sky. Similarly, a "greener-tree" marker may be provided by a digital image adjustment application. The digital image adjustment application may also enable a user to modify parameters, associated with the selection and activity controls.

FIG. 1 is a block diagram illustrating automated processes 10 and 12, according to respective example embodiments, for the performance of one or more localized activities with respect to source digital data 14. In a first embodiment, the source digital data 14 and a marker 16 provide input to an automated activity process 10. The marker 16 includes location data 18, identifying a location in the source data 14, an activity control 20 specifying an activity type and associated activity parameters, and a selection control 22 specifying a selection type and associated parameters. The activity process 10 is shown to perform an activity process 24 (e.g., image adjustment) with respect to the source data 14, in accordance with the activity control 20, to generate adjusted data 26. A selection process 28, to define a selection mask, is also performed. Effects of the activity process 24 are then localized utilizing the selection mask to generate destination data 30. Specifically, the effects of the activity process 24 are localized, by the selection mask, to a selected portion 32 of the destination data 30. The marker 16 may then optionally be modified (e.g., any of the location data 18, activity control 20 or selection control 22 may be modified) by a user or an automated process to invoke a further iteration of the automated activity process 10.

The second example automated activity process 12 differs from the process 10 in that a selection process 28 precedes the activity process 24. Accordingly, the selection process 28 is shown to generate a selection mask that identifies a selected portion 36. The activity process 24 is then applied with respect to the selected portion 36, thereby to generate destination data 30, in which the effects of the activity process 24 are localized to a selected portion 32. Again, the marker 16 may be modified to invoke a further iteration of the automated activity process 12.

Figure 2:
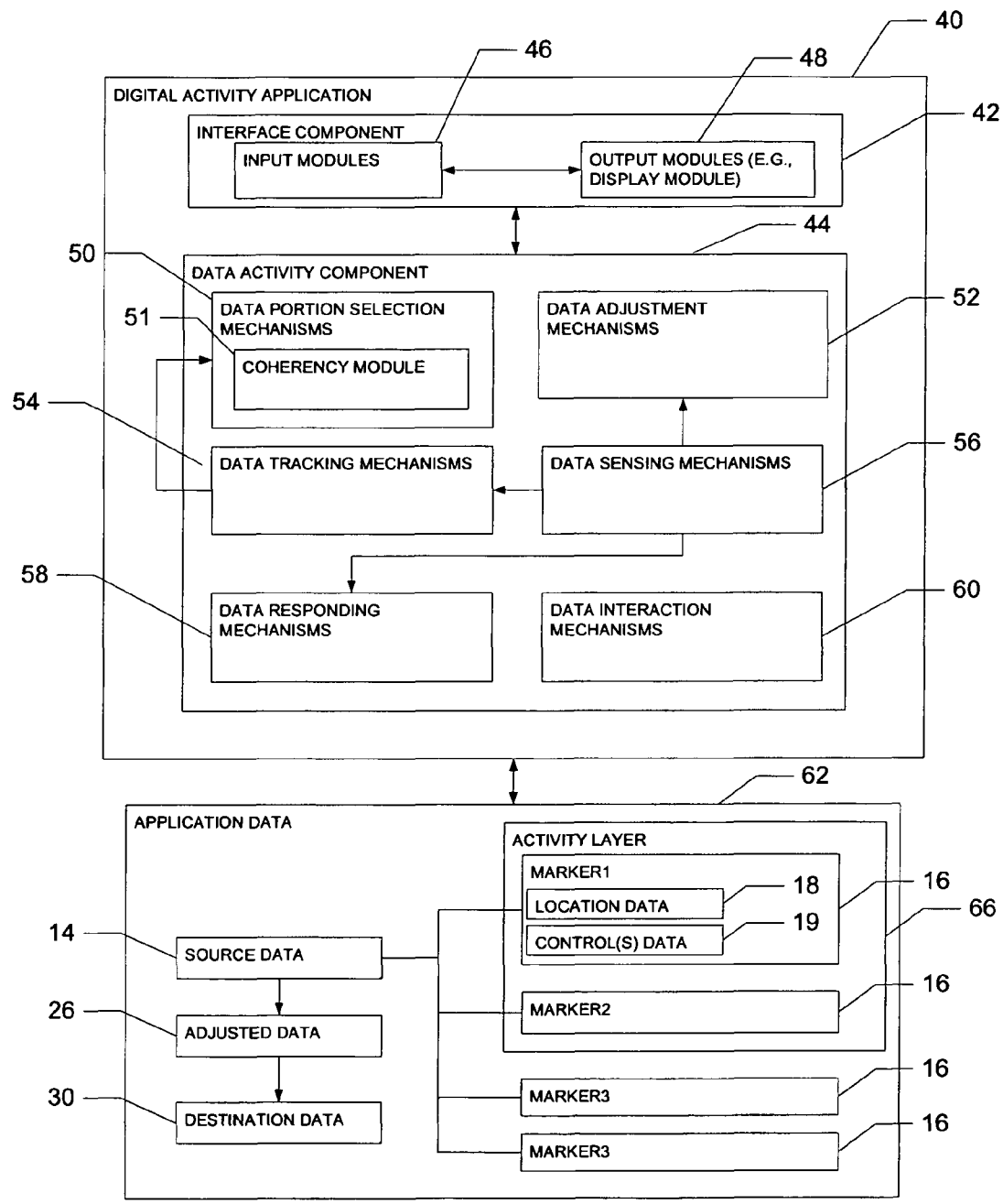
FIG. 2 is a block diagram illustrating the architecture of a digital data activity application, and associated application data, according to an example embodiment of the present invention.

FIG. 2 is a block diagram illustrating an example system, in the form of a digital data activity application 40, to perform a localized activity with respect to digital data. The digital data activity application 40 may, example comprise a photo editing application (e.g., Adobe® Photoshop® or iPhoto), a video editing application (e.g., Adobe® After Effects® or iMovie), an audio processing application (e.g., Adobe® Audition®, or iTunes), or a document processing application (e.g., Adobe® Acrobat®) or a Microsoft Word). The digital data activity application 40 is described below as including a number of modules or mechanisms. A module or a mechanism may be a unit of distinct functionality that can provide information to, and receive information from, other modules. Modules may facilitate communication with input or output devices, and can operate on a resource (e.g., a collection of information).

The activity application 40 includes (1) an interface component 42 and (2) a data activity component 44. The interface component 42 operates to receive input from, and to provide output to, a user of the activity application 40, and/or to other systems and applications. To this end, the interface component 42 includes one or more input modules 46 to receive source digital data 14 from a device or system (e.g., an audio input device, a digital camera, a video camera, a disk drive etc). The input module 46 also enables the activity application 40 to receive input, via a user interface, from a user. For example, the input module 46 enables a user to input location data 18, specifying a location with respect to source digital data 14.

The interface component 42 also includes one or more output modules 48 to provide output to one or more external devices or systems (e.g., a display device, an audio reproduction device, or a disk drive).

The data activity component 44 is shown to include selection logic, in the example form of a data portion selection mechanism 50, and multiple instances of activity logic. In the example embodiment, the activity logic may include data adjustment mechanisms 52, data tracking mechanisms 54, data sensing mechanisms 56, data responding mechanisms 58 and data interaction mechanisms 60, each of these mechanisms 52-60 operating to perform a specific activity with respect to source digital data 14. The effects of these activities are localized utilizing the data portion selection mechanism 50, which creates a selection mask in terms of which the effects of the activities may be localized. These selection mechanisms 50 are shown to include, among other modules, a coherency module 51 that uses a coherent classification methodology to segment source digital data 14 as part a selection process.

Coherent classification may be regarded as a data item (e.g., pixel) classification technique that uses an objective cost function with two types of costs, namely regional costs and boundary costs. For example, with respect to pixels, a regional cost may reflect the cost of labeling a particular pixel as foreground or background. A boundary cost may reflect the cost of labeling a pair of neighboring pixels as both foreground, both background, or one each foreground and background. The boundary cost of labeling a pair of pixels with different classifications is high when two pixels have a similar color, since it is likely that pixels with a similar color would either be both in the selection of not. Regional costs may typically be determined by comparing the color of a given pixel to a model of colors expected in the foreground or the background. Regional costs may also be assigned piecewise constant values, with distinct values being given to known foreground, known background, and unknown data items. Generally, this model is derived from the selected pixels provided by the user. Coherent classification may be determined by finding a labeling of pixels (e.g., either as foreground or background, or as included or excluded from a selection) that minimizes a cost function constrained by user-selected pixels within an image. Such a cost minimization function may be solved, in an example embodiment, as a minimum graph cut problem, or its equivalent namely a maximum graph flow problem. Further details regarding a method of performing coherent classification with respect to image data are provided in co-pending U.S. application Ser. No. 11/517,189 entitled, "LIVE COHERENT IMAGE SELECTION," filed on Sep. 6, 2006.

At a high level, the data adjustment mechanisms 52 may perform one or more adjustments (or modifications) to a selected portion of the source digital data 14. Before discussing the various example mechanisms 52-60 in further detail, it is useful to consider the application data 62 that constitutes input to, and is generated as output by, the activity application 40. Specifically, the application data 62 is shown to include the source digital data 14, the adjusted data 26 (which constitutes an intermediate output of the activity application 40) and the destination data 30 (which constitutes output of the activity application 40). A collection of activity markers 16 may be associated with each instance of source digital data 14, each marker 16 including location data 18 and control data 19. The location data 18 include a marker origin (r0) that identifies a location (e.g., a two-dimensional or three-dimensional image coordinate) with respect to the source digital data 14

The control data 19 may also identify one or more data portion selection mechanisms 50, in embodiments where multiple selection mechanisms are included.

The control data 19 may identify one or more adjustment mechanisms 52 that are associated with the marker 16 (e.g., color or lighting adjustment mechanisms), as well as parameters that control the operational functioning of the identified adjustment mechanisms 52

In one embodiment, the association between each of the markers 16 and the source digital data 14 is user-created, as a result of input received from a user via the interface component 42. However, certain markers 16 may be automatically instantiated, and associated with source data 14, as a result of activities performed by the data sensing and/or data responding mechanisms 56 and 58.

A subset of the markers 16 may furthermore be associated with an activity layer 66, as will be further described below.

Returning to the activity logic, the data adjustment mechanisms 52 may include a collection of mechanisms, identifiable by control data 19 of a marker 16, which perform adjustment operations with respect to the source digital data 14. The types of adjustment may depend on the types of digital data with respect to which the activity application 40 is adapted to perform activities. For example, where the activity application 40 is an image editing application, the data adjustment mechanisms 52 may specify a number of image adjustment operations. Where the activity application 40 is an audio or video editing application, the adjustment mechanisms 52 will similarly be suited to adjusting these data types.

The data tracking mechanisms 54, which may again be associated with a marker 16 via the location data 18, may operatively track characteristics associated with a particular marker 16, as well as various selection and adjustment characteristics. For example, in an embodiment in which the source digital data 14 comprises digital video data, a tracking mechanism 54 may enable a marker 16 automatically to be relocated with respect to the video data (e.g., as image content, within the video data, moves). In one embodiment, a data tracking mechanism 54 may operatively modify the location data 18 of a marker 16. Accordingly, when a marker 16 is located on particular image feature or object, a data tracking mechanism 54 may provide the capability for that marker 16 to remain associated with the image feature or object as that feature or object moves through a sequence of video frames.

To implement a tracking ability, a tracking mechanism 54 may utilize initial state information (e.g., location data 18 indicating a fixed location). The location data 18 associated with a data tracking mechanism 54 may indicate if the relevant marker 16 is to be fixed at a specific location with respect to the source data 14 (e.g., it is to be fixed at an image coordinate (x,y position)). The state is set to "fixed" for an initial video frame, but set to "not fixed" for subsequent video frames, which indicates that the marker 16 is relocatable to track an underlying image, object or feature from the initial fixed frame, or from a previous image frame.

A data tracking mechanism 54 may utilize any one of a number of tracking algorithms described in published literature. For example, in one embodiment, a search window region may be defined around a location, identified by the location data 18. For each of a multitude of locations of a smaller track window, placed within the larger search window region, a "similarity measure" is calculated. The similarity measure quantifies how similar the track window is to an equal size track window placed at the location, identified by the location data 18, in either an initial frame or a previous frame. One such "similarity measure" is the negative of the mean squared difference of pixel intensity value, averaged over all color components. For the multitude of search points, that point which is the most similar (e.g., has the largest "similarity measure") is chosen as the new "tracked location" for the video frame. Accordingly, the location data 18 may then be modified to equal the new tracked location. Accordingly, the marker 16 is moved to the new "tracked location."

Another method of tracking uses a histogram comparison, an example of which is more fully described in the following document:

*IEEE TRANSACTIONS ON PATTERN ANALYSIS AND MACHINE INTELLIGENCE*, VOL. 25, NO. 5, MAY 2003 *Kernel-Based Object Tracking*. Dorin Comaniciu, Senior Member, IEEE, Visvanathan Ramesh, Member, IEEE, and Peter Meer, Senior Member, IEEE.

If an image in each frame of source video data is first converted to a gradient magnitude image, then the above-described tracking mechanism will be more sensitive to edges in the image. The gradient magnitude can be the root mean square of the result of applying a horizontal Sobel photo and a vertical Sobel filter. Example Sobel filters are more fully described in the following document:

R. Gonzalez and R. Woods, *Digital Image Processing*, Addison Wesley, 1992.

The adjustment parameters of a marker 16 may additionally reference one or more data sensing mechanisms 56. In one embodiment, a data sensing mechanism 56 may enable a marker 16 to "sense" a local environment. For example, where the source digital data comprises video or image data, if the associated marker 16 is placed on an eye, the data sensing mechanism 56 may enable the marker 16 to detect the presence of an eye feature, and respond accordingly. The response may be an alert to a user of the activity application 40 that the marker 16 has been located on an eye, and perhaps that eye correction adjustment (e.g., red eye correction, whitening of cornea, saturating iris, etc.) should be applied. Alternatively, such adjustments may be made automatically. To this end, the data sensing mechanisms 56 are shown to be communicatively coupled to the data adjustment mechanisms 52. In the event that, for example, an eye is detected, the data sensing mechanism 56 may invoke an appropriate image adjustment mechanism 52 in an automated fashion to make an image adjustment.

A further data sensing mechanism 56 may enable a marker 16 to sense when an underlying image, feature or object changes. For example, a data sensing mechanism 56 may retain stored image data from a window around a location identified by the location data 18. The data sensing mechanism 56 may then compare this window to a selected video frame, for example, with corresponding window image data, from a current video frame on which the marker 16 is located. Sensing may consist of measuring the average squared difference according to the following equation:

$$\text{sensation} = \langle [I1(r) - I2(r)]^2 \rangle,$$

where $I1(r)$ is image intensity or color data at location r from one video frame and $I2(r)$ is the data at the same relative location in another frame, and $\langle \ldots \rangle$ indicates an average value taken over all pixels located within the window. In addition to taking the average difference in squared image intensity (e.g., including color) values, the average may incorporate the difference in squared gradient values. This may replace the intensity difference or may supplement it with an associated weight.

The control data 19 of a marker 16 may also associate one or more data responding mechanisms 58 with a particular marker 16. The data responding mechanisms 58 may, as shown in FIG. 2, be communicatively coupled to a data sensing mechanism 56, and receive input from a data sensing mechanism 56. As noted above, for source video data, where a data sensing mechanism 56 detects an image change (e.g., greater than a predetermined threshold), the data sensing mechanism 56 may invoke a response by the marker 16. Such a response, in one embodiment, is provided by one or more data responding mechanisms 58. For example, the response issued by a data responding mechanism 58 may be an alert to the user. Alternatively, the response may be a signal that is sent to the activity application 40, for the purpose of coordinating image modifications. Alternatively, a response signal may be sent as a message (e.g., an e-mail, a phone text message, a phone message, or an electronic message of another sort) directed towards another computer program or device. A data responding mechanism 58 may further send a message to components of another marker 16 that is associated with the subject source digital data 14, or to a marker 16 associated with a different source digital data 14 (e.g., source digital data of a different type).

The control data 19 of a marker 16 may furthermore associate one or more data interaction mechanisms 60 with the relevant marker 16. In one embodiment, the data interaction mechanisms 60 enable multiple markers 16, associated with common or different source digital data 14, to interact. For example, markers 16 may interact to maintain a specified spatial arrangement. Consider an example in which the source data 14 is a video data, comprising a video clip monitoring a house. A marker 16 is then located with respect to the video clip. Utilizing an appropriate data sensing mechanism 56, the marker 16 analyzes the image data (or other document data) in the vicinity of a specified location for the purposes of responding in a predetermined manner, as dictated by a data responding mechanism 58. The sensing operation may be to determine if the marker 16 is located on a human face, in which case the marker 16 may set (or select) a data adjustment mechanism 52 to make an appropriate skin tone correction. Similarly, if the marker 16 is located on sky, it may select appropriate "blue sky" adjustment mechanism 52.

In the monitoring example, in the event that the data sensing mechanism 56 of the marker 16 senses a change in local scene content (e.g., notices that the door has been opened), an associated data responding mechanism 58 may be invoked to send a message to other markers 16, associated with the image, or to markers 16 associated with a different video clip. For example, once a specific marker 16 detects that the door has been opened, a marker 16 located near a vault or jewelry box may be instantiated and/or activated to begin sensing operations, utilizing a data sensing mechanism 56, to detect or analyze faces (e.g., black ski masks) within the vicinity, and to generate an appropriate notification (e.g., an e-mail message to a homeowner) or to activate an alarm.

While the mechanisms 52-60 have above been described with reference primarily to video data, it will readily be appreciated that these mechanisms may equally be applied to other types of digital data. For example, the source digital data 14 may be audio data. In this case, one or more data tracking mechanisms 54 may track a specific audio feature or object within the audio data (e.g., a specific voice, instrument, frequency, tone, etc.). Similarly, a data sensing mechanism 56 may operate to sense a particular characteristic of the underlying audio data so as to enable the tracking. The sensing mechanism 56 may also then invoke one or more adjustment mechanisms 52 to adjust a sensed (and possibly tracked) audio feature or object in an underlying audio track. Similarly, a data responding mechanism 58 may provide an alert, or perform some other action, in response to a detected condition. For example, where the audio data comprises surveillance information, a sensing mechanism 56 may be configured to detect the voice of a particular individual. Responsive to detecting such a voice, the data sensing mechanism 56 may invoke a data adjusting mechanism 52 to adjust the audio data (e.g., by enhancing the sensed voice), and may also invoke a data responding mechanism 58 to provide a user with an alert indicating that the relevant voice has been detected.

A more detailed discussion regarding how an example embodiment of the present invention may be utilized with respect to still image data is provided below, with reference to FIGS. 5-11.

Figure 3:
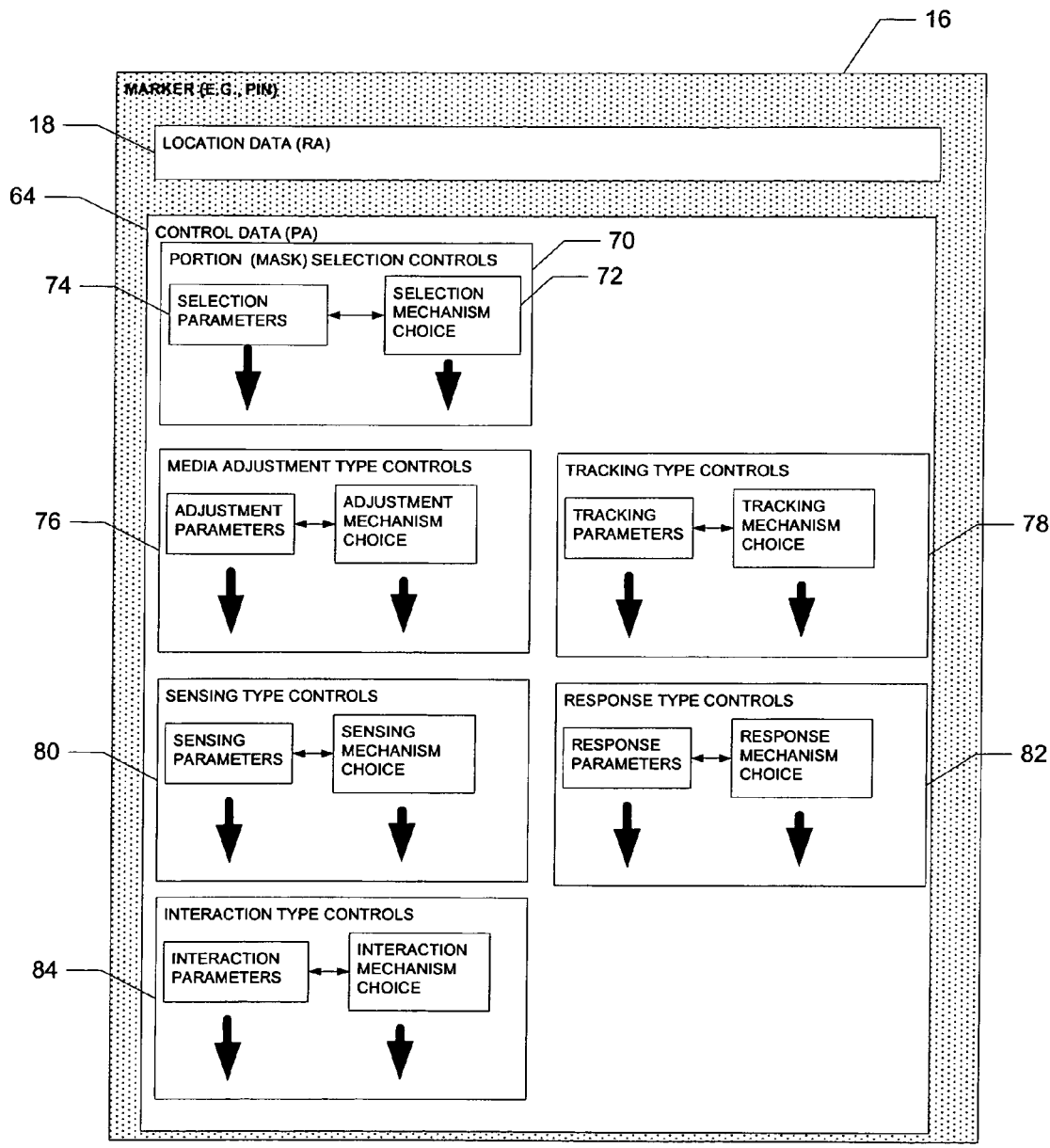
FIG. 3 is a block diagram illustrating the structure of a marker, according to an example embodiment of the present invention, that has location data and control data associated therewith, the control data including selection controls and various activity controls.

FIG. 3 is a block diagram providing further detail regarding the structure of a marker 16, according to an example embodiment of the present invention. As mentioned above with reference to FIG. 2, a marker 16 may include location data 18 (e.g., the marker origin (r0)), the value of which identifies a location within source digital data 14 with which the marker 16 has been associated either by a user or an automated process (e.g., by a data sensing mechanism 56). The marker 16 is also shown to include control data 19, which includes one or more of the controls. The example marker in FIG. 3 is shown to include (1) portion (or mask) selection controls 70, which include a selection mechanism choice 72 (e.g., the identification of one of a number of data portion selection mechanisms 50 supported by the activity application 40), and (2) one or more selection parameters 74 associated with the selection mechanism choice 72. The data portion selection mechanism 50, identified by the selection mechanism choice 72, utilizes the selection parameters 74 in order to perform a parametrically-controlled selection of a portion of the source digital data 14 to which the effects of one or more activities are to be localized.

In an example embodiment, wherein the selection mechanism choice 72 identifies the coherency module 51 as a selection mechanism, the selection parameters 74 associated with the coherency module 51 may include a radius parameter (R), a data item (e.g., pixel) local energy pair, $\epsilon^+_i$ and $\epsilon^-_i$. In considering an example in which a data item is a pixel, the letter 'i' may be used to label each pixel in the image. A '+' may be used to designate a selected pixel (e.g., foreground pixel) and '−' may be used to designate a non-selected pixel (e.g., background pixel). The control data 18 may also include a neighbor interaction energy strength (v0) and a neighbor interaction color spread. Other selection parameters may include an edge softness (or feather) amount and an edge choke amount, example.

The control data 19 is shown to include a number of activity controls 76-84, each of which includes an appropriate mechanism choice, and associated parameters. It will be noted that, in the example embodiment, the controls 76-84 correspond to the various adjustment mechanisms 52-60 described above with reference to FIG. 2. Accordingly, each of the mechanism choices identifies one or more mechanisms from the mechanisms 52-60 supported by the activity application 40. The associated parameters are utilized by the chosen mechanisms to perform their respective activities.

Figure 4:
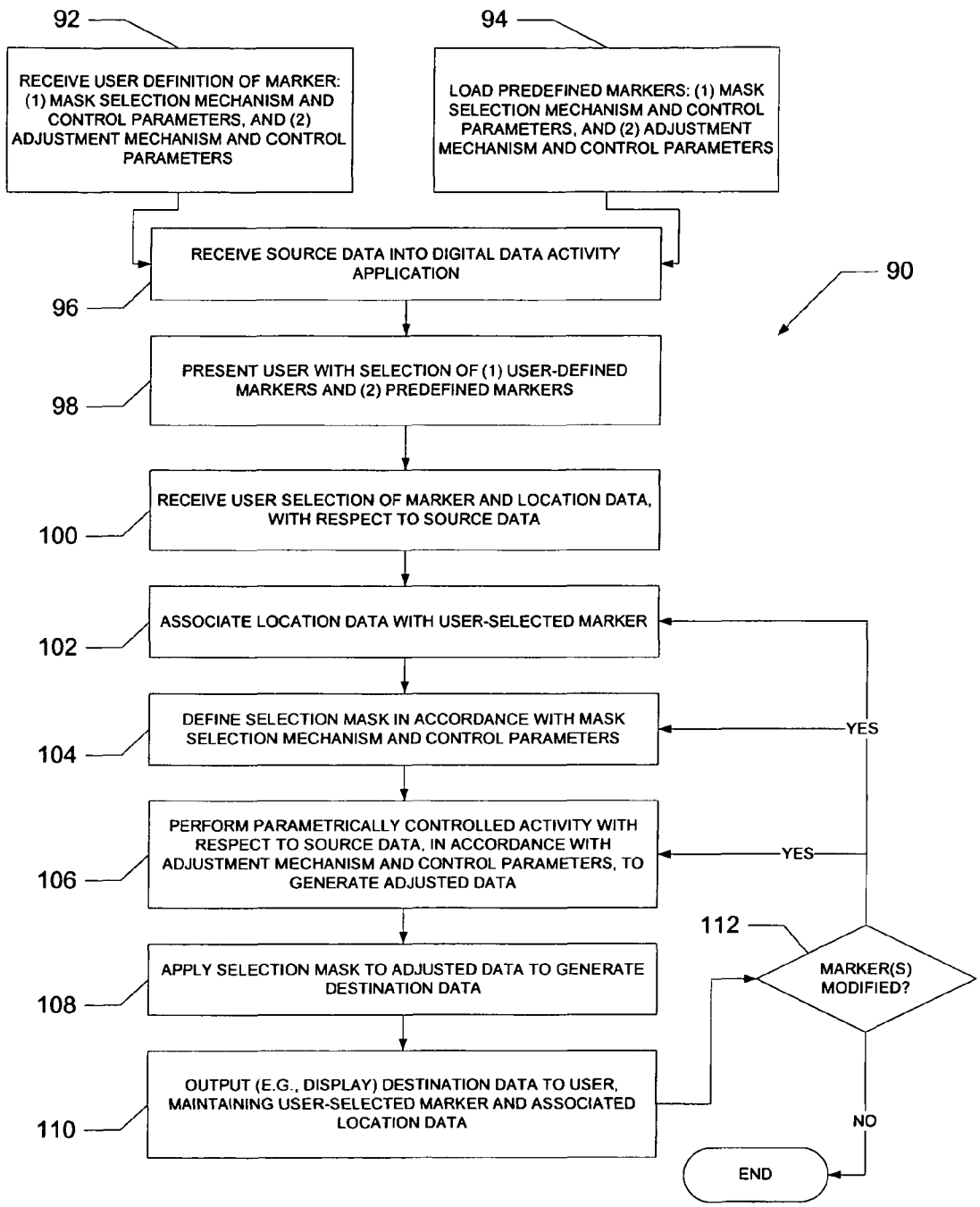
FIG. 4 is a flowchart illustrating a method, according to an example embodiment of the present invention, to perform localized activity with respect to digital data.

FIG. 4 is a flow chart illustrating a method 90, according to an example embodiment, to perform a localized activity with respect to digital data. In one embodiment, the method 90 may be performed by the activity application 40, as discussed above with reference to FIG. 2, utilizing the discussed application data 62. The method 90 commences at blocks 92 and 94. Specifically, at block 92, the activity application 40 may, via an input module 46 of the interface component 42, receive a user definition of one or more markers 16. To this end, a user may define control data 19 to be associated with the marker 16. Location data 18 is provided later, once the marker 16 is associated with a particular location on subject source digital data 14. The control data 19 may include user selection of a particular data portion selection mechanism 50 (e.g., the coherency module 51), and associated selection parameters 74, as well as the identification of one or more adjustment mechanisms 52-60, and associated control parameters. Examples of such data portion selection mechanisms, adjustment mechanisms, and associated control parameters with respect to image data, are discussed below with reference to FIG. 6.

At block 94, the activity application 40 may also load a collection of predefined (or preconfigured) markers 16, each predefined marker 16 having a predefined data portion selection mechanism 50, one or more activity predefined mechanisms 52-60, and associated control parameters. For example, such a predefined marker 16 may be the example "blue-sky" marker 16 discussed above with reference to FIG. 2.

At block 96, source data 14 is received into the digital data activity application 40. For example, the application 40 may retrieve the source data 14 from a disk drive associated with a computer system on which the application 40 is executed. Alternatively, the application 40 may received the data from an external device (e.g., a digital camera, a video camera, a microphone etc.).

At block 98, the application 40 presents the user with a selection of markers (e.g., user-defined markers 16 and predefined markers 16). Specifically, the interface component 42 may present a menu displaying marker icons associated with a collection of markers 16, so as to enable user selection of one or more of these markers 16. In one embodiment, the marker icons that are presented may differ from each other according to the selection and/or adjustment mechanisms associated with an underlying marker 16.

At block 100, the application 40, via the interface component 42, receives a user selection of a specific marker 16, as well as location data 18 (e.g., a marker origin (r0)), indicating a location with respect to the source data 14. The location data 18 may be received by the generation of a user interface, displaying a representation of the source data 14, relative to which the user can locate a marker icon representing the marker 16. For example, the user may be enabled, via the user interface, to "drag-and-drop" a marker icon to a location on a displayed digital image. In one embodiment, the interface component 42 may provide a "snap to" feature, which identifies a feature of displayed digital image data that is proximate to a location at which a user may have dropped a marker icon, and then moves of the marker icon to the identified feature. In an alternative audio embodiment, the user may be able to drag-and-drop an appropriate marker icon onto a track representation of an audio or video data. In yet another embodiment, the user may drag-and-drop a marker icon onto a specific text, or other objects, displayed within a document, where the activity application 40 is a word-processing application. By sensing the location at which a user has placed the marker icon, the activity application 40 is able to determine and receive the location data 18.

At block 102, the application 40 associates the location data 18 with the appropriate marker 16, for example by storing the location data 18 within the context of a marker 16.

With respect to blocks 100 and 102, the user may be able to select and locate, with respect to a representation of the source data 14, multiple markers 16, each potentially being of a different type and having different characteristics.

At block 104, the application 40 defines a selection mask with respect to the source data 14, utilizing the portion selection mechanisms 50, and associated selection parameters 74, of each of the selected markers 16. In the case where multiple markers 16 have been user-selected, a composite mask selection is defined at block 104 according to any one of a number of combination techniques. A discussion regarding one such example method is provided below with reference to FIG. 9.

At block 106, the application 40 performs a parametrically-controlled activity (e.g., an adjustment, tracking operation, sensing operation, responding operation, or an integration operation) with respect to the source data 14, in accordance with the selection mechanism choices, and associated control parameters, for each of the markers 16, thereby to generate the adjusted data 26. Specifically, in one embodiment, the parametrically-controlled activities may be performed globally with respect to the source data 14 in order to generate the adjusted data 26.

At block 108, the application 40 applies the selection mask, defined at block 104, to the adjusted data 26 in order to localize the effects of the one or more parametrically-controlled activities performed at block 106. The output of this operation is the destination data 30, within which the effects of the parametrically-controlled activity have been localized to a selected portion 32.

At block 110, the application 40, via the output modules 48 of the interface component 42, outputs (e.g., displays, produces an audio representation etc.) the destination data 30 to a user (or further external computer system), while maintaining the user-selected marker(s) 16, and associated location data. A user-selected marker 16, and associated location data, persists (or is maintained) subsequent to the parametrically-controlled activities performed at block 106, the application of the selection mask at block 108, and the output of the destination data 30 at block 110.

At decision block 112, a determination is made by the application 40 whether the user has, via the interface component 42, modified any one or more of the markers 16. In an alternative embodiment, an automated process (e.g., a further marker 16 or an external application) may also modify a marker 16. Modifications to the one or more markers 16 may include a re-location of a marker icon with respect to the source data 14. For example, a user, utilizing an appropriate interface, may move a marker icon from an initial location to a further location with respect to a representation of the source data 14. Alternatively, the control data 19 may have been modified. A selection mechanism choice 72, associated with a portion selection control 70, may also have been modified. Alternatively, one or more selection parameters 74 of a selection control 70 may have been modified. Further, an activity control may have been modified. For example, the adjustment mechanism choice, or one or more associated parameters, may have been modified.

A user interface, generated by the interface component 42, allows a user to select (e.g., by a "double click" mouse operation) an appropriate marker icon, responsive to which a modification menu is displayed. The modification menu allows the user conveniently to input an alternative selection by specifying a different selection mechanism choice 72, and/or inputting different values for the selection parameters 74. A dialog box, also generated and displayed in response to user selection of an appropriate marker icon, may enable a user to make an alternative mechanism choice with respect to any one of a number of activity controls, and also to modify or replace control parameters associated with an appropriate mechanism.

Having determined, at decision block 112 that one or more markers 16 have been modified, the method 90 loops back to either block 102, 104 or 106, depending on the modifications that have been made with respect to a marker 16. For example, where the location data 18 has been modified, the method 90 loops back to block 102. Where a selection mechanism choice 72, and/or a selection parameter 74, has been modified, the method 90 loops back to block 104. Where an adjustment mechanism choice, and/or an associated control parameter, has been modified, the method 90 may loop back to block 106.

The method 90 may accordingly enable a "live", or near real-time, representation to a user with respect to the modification of an activity (e.g. an updating on modification) performed with respect to source data 14 (e.g., a digital image). Because the location data 18 and the control data 19 are maintained subsequent to the operations performed at blocks 104-110, and the user is able selectively to modify a subset (or even all) of this data, the user is conveniently able to perceive the effects of a modification of a mechanism choice, or a control parameter, while other mechanisms and control parameters are maintained. Accordingly, the local adjustments may be viewed as being "live", and can be performed in any order, with prompt feedback (e.g., visual or otherwise) with respect to a representation of the destination data 30.

The method 90 is described above, at block 106, as performing one or more parametrically-controlled activities on a global basis with respect to the source data 14 and subsequently applying a selection mask to localize the effects of such activities. In an alternative embodiment, the selection mask may be applied to the source data 14 prior to the performance of a parametrically-controlled activity, whereafter the effects of that parametrically-controlled activity may be localized to a portion of the source data 14 defined by the selection mask.

Figure 5:
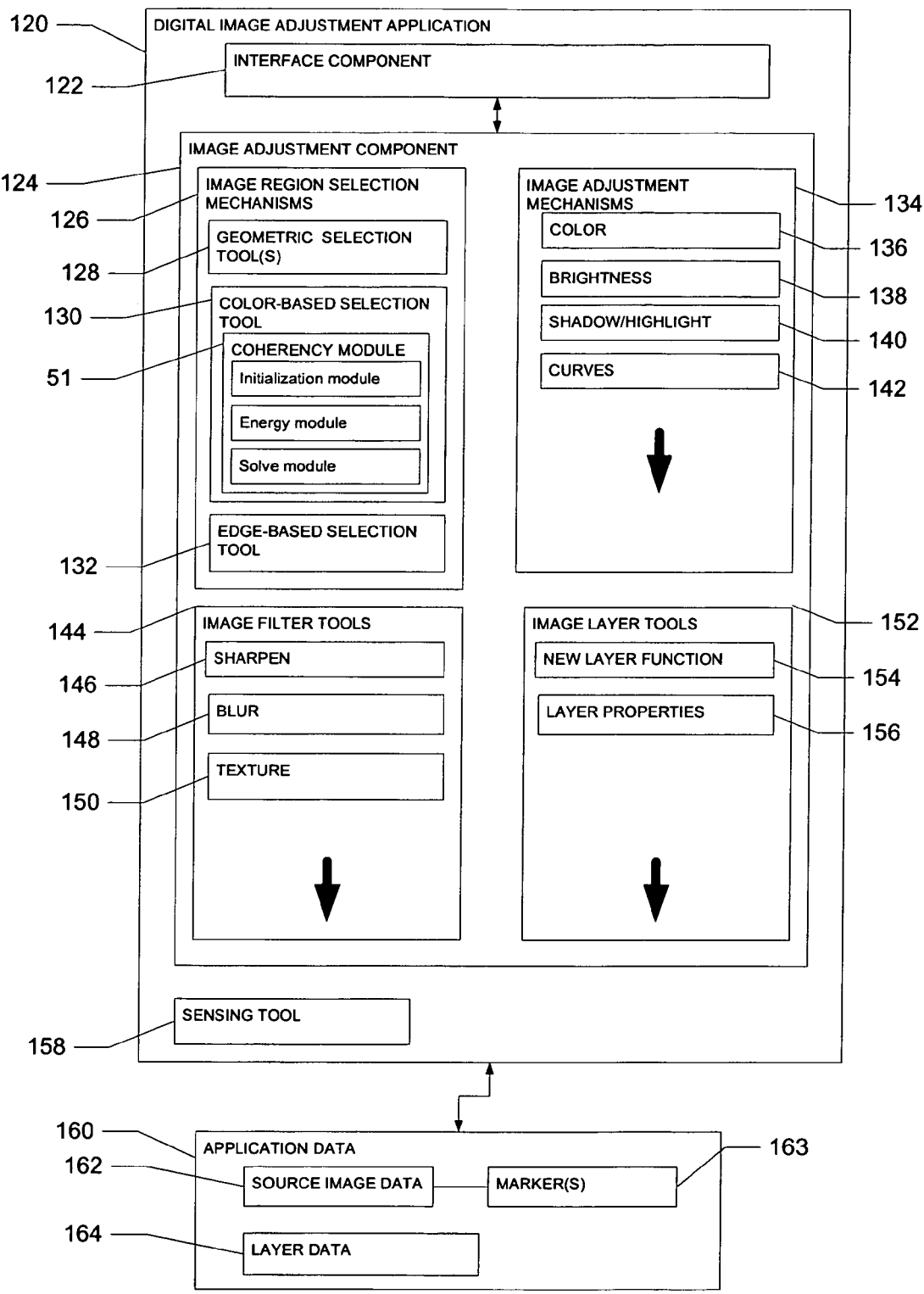
FIG. 5 is a block diagram illustrating the architecture of a digital data activity application, in the specific example form of a digital image adjustment application, according to one embodiment of the present invention.

FIG. 5 is a block diagram illustrating an example embodiment of an activity application 40, in the form of a digital image adjustment application 120. The adjustment application 120 enables a user to perform various editing and modification operations with respect to digital images. One example of such an application is the ADOBE® PHOTOSHOP® application.

The adjustment application 120 is shown to include an interface component 122, and an image adjustment component 124. The image adjustment component 124 in turn incorporates a number of mechanisms, namely a collection of image region selection mechanisms 126, a collection of image adjustment mechanisms 134, a collection of image filter tools 144, and a collection of image layer tools 152. The image region selection mechanisms 126 assist a user in selecting a region of a digital image to which to apply any one or more of the image adjustment mechanisms 136 or the image filter tools 144. Example region selection mechanisms 126 include geometric selection tools 128, color-based selection tools 130 (e.g., the coherency module 51) and edge-based selection tools 132. In one embodiment, any one or more of the selection mechanisms 128-132 may be associated with a marker 16. For example, the selection mechanisms 128-132 may enable a marker 163 to perform a parametrically-controlled selection of a region of a digital image, with respect to a marker location identified by location data 18, utilizing measures of the spatial extent radius and further amount, color range, fuzziness, and edge sensitivity with respect to the marker location.

Example image adjustment mechanisms 134 are shown to include color, brightness, shadow/highlight and curve mechanisms 136, 138, 140 and 142.

The example image filter tools 144 include sharpen, blur and texture tools 146, 148 and 150. These also provide examples of adjustment mechanisms that may be applied with respect to source data 14.

The image layer tools 152 include a "new layer" function 154, and a layer properties function 156. As noted above, image layers provide examples of activity layers that may be applied with respect to source data 14, so as to enable activities to be applied with respect to a representation of underlying source data 14 in a non-destructive manner. In one embodiment, the image layer tools 152 may enable the creation of a layer (e.g., a marker layer) that is specifically adapted to accommodate one or more markers 163 to be applied with underlying image data. A selection mask, associated with the marker layer, may be built, utilizing a set of markers 163 and their associated parameters. A user is furthermore able to create a number of marker layers, each marker layer accommodating markers 163 having a certain common characteristic. Accordingly, unique sets of markers 163 may be associated with each of a number of distinct image layers. This feature allows a user conveniently to activate and deactivate such a group of markers 163 that are associated with a particular layer by activation and deactivation of the relevant image adjustment layer.

The image adjustment application 120 may also include sensing logic, in the example form of one or more sensing tools 158, that is configured to sense predetermined characteristics of an image feature or object within source image data 162, in a manner described, for example, above with reference to FIG. 2.

The application data 160 includes, inter alia, the source image data 162, with which one or more markers 163 are shown to be associated. The application data 160 also includes layer data 164 that may store an association of a subset of markers 163 with an image adjustment layer.

Figure 6:
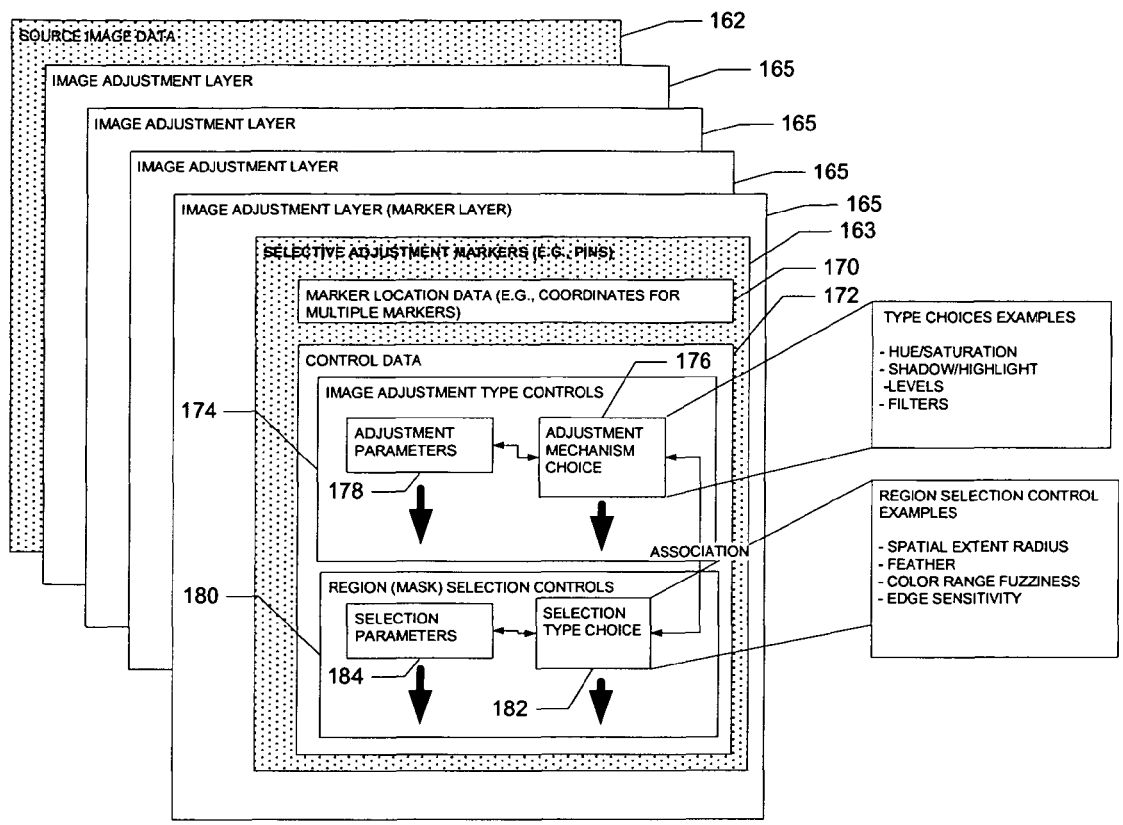
FIG. 6 is a block diagram illustrating the structure of image adjustment markers, which may be associated with one or more image adjustment layers in an example embodiment of the present invention.

FIG. 6 is a block diagram providing a conceptual representation of the application of multiple image adjustment layers 165 to source image data 162, according to an example embodiment. As shown, any number of image adjustment layers 165 may be overlaid on a representation of the source image data 162 to modify a representation thereof. FIG. 6 illustrates the top image adjustment layer 165 as being a marker layer, having one or more markers "contained" or residing within the context of the marker layer. The markers 163 are shown to include location data 170 (e.g., the two-dimensional or three-dimensional coordinates with respect to the image data 162) and associated control data 172. The control data 172 in turn includes one or more image adjustment type controls 174, each indicating an adjustment mechanism choice 176 (e.g., brightness, shadow/light, levels, filters etc.), and one or more adjustment parameters 178 associated with each adjustment mechanism choice. For example, where the adjustment mechanism choice 176 indicates brightness, an associated adjustment parameter 178 may be a numeric value indicating whether this adjustment tool is to be negatively or positively applied, and also the extent to which the tool is to be positively or negatively applied.

The control data 172 also includes region (or mask) selection controls 180, including one or more selection type choices 182, and one or more selection parameters 184 associated with each such selection type choice 182. For example, a specific selection type choice 182 may indicate a spatial extent radius, feather, color range fuzziness, or edge sensitivity selection type, for example. Each of the selection type choices 182 has an associated selection parameter 184 associated therewith so as to enable a parametrically-controlled application of the selection type choice 182.

In one embodiment, each marker 163 may furthermore have one or more "toggle" or switch parameters associated therewith to enable a user selectively to activate and deactivate an appropriate adjustment mechanism and/or selection mechanism. To this end, a marker icon for a particular marker 163 may provide a visual representation of one or more "toggle" switches that enable a user to activate or deactivate an activity and/or selection mechanism associated with the underlying marker 163. In a further embodiment, switch parameters associated with a marker 163 may allow an activity or selection mechanism to be positively applied, negatively applied, or neutrally applied.

Figure 7:
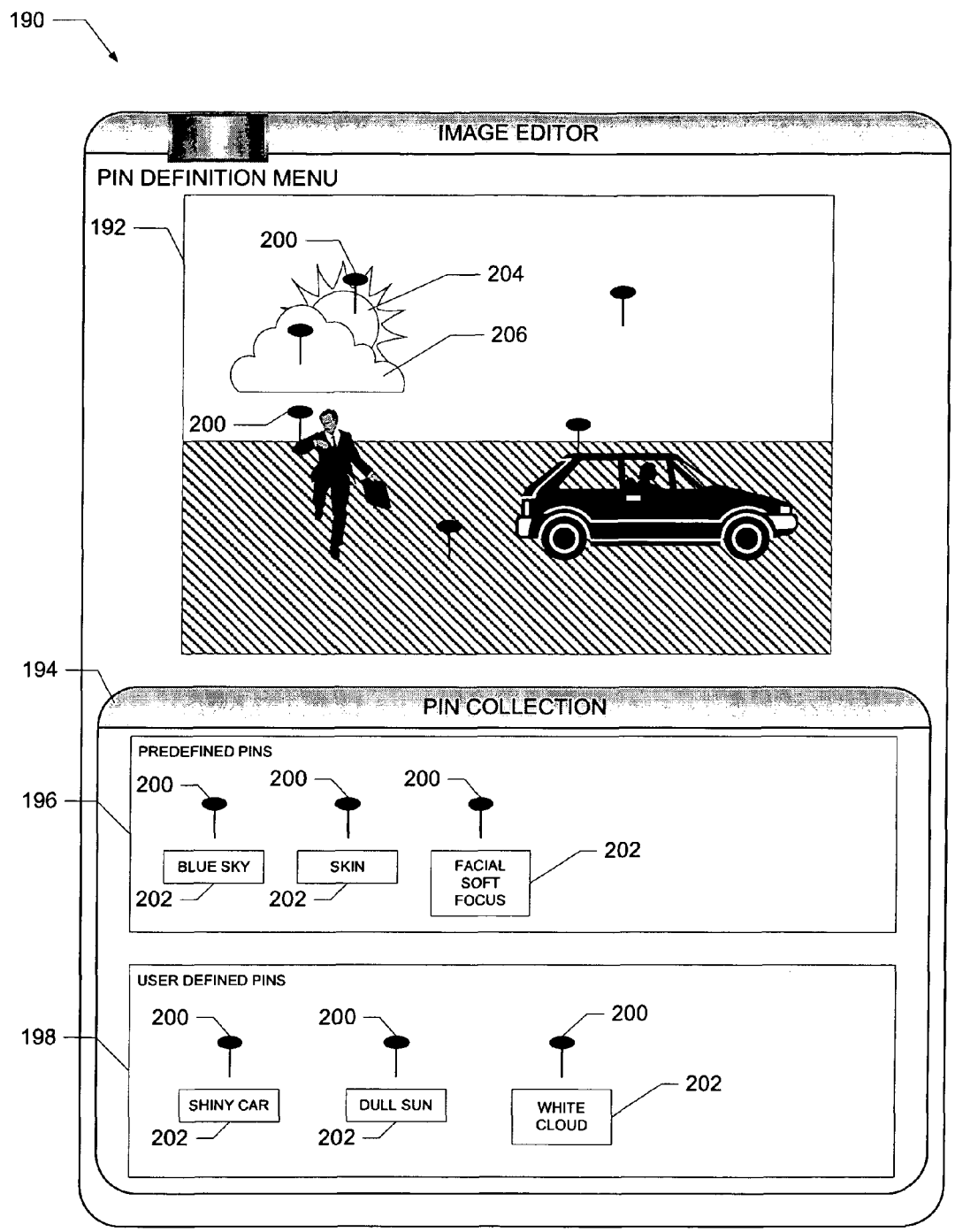
FIG. 7 is a user interface diagram illustrating an example user interface that may be generated by the interface component of a digital data activity application, according to an example embodiment of the present invention, and illustrates the placement and display of markers, in the example form of "pins", within the context of the user interface.
Figure 8:
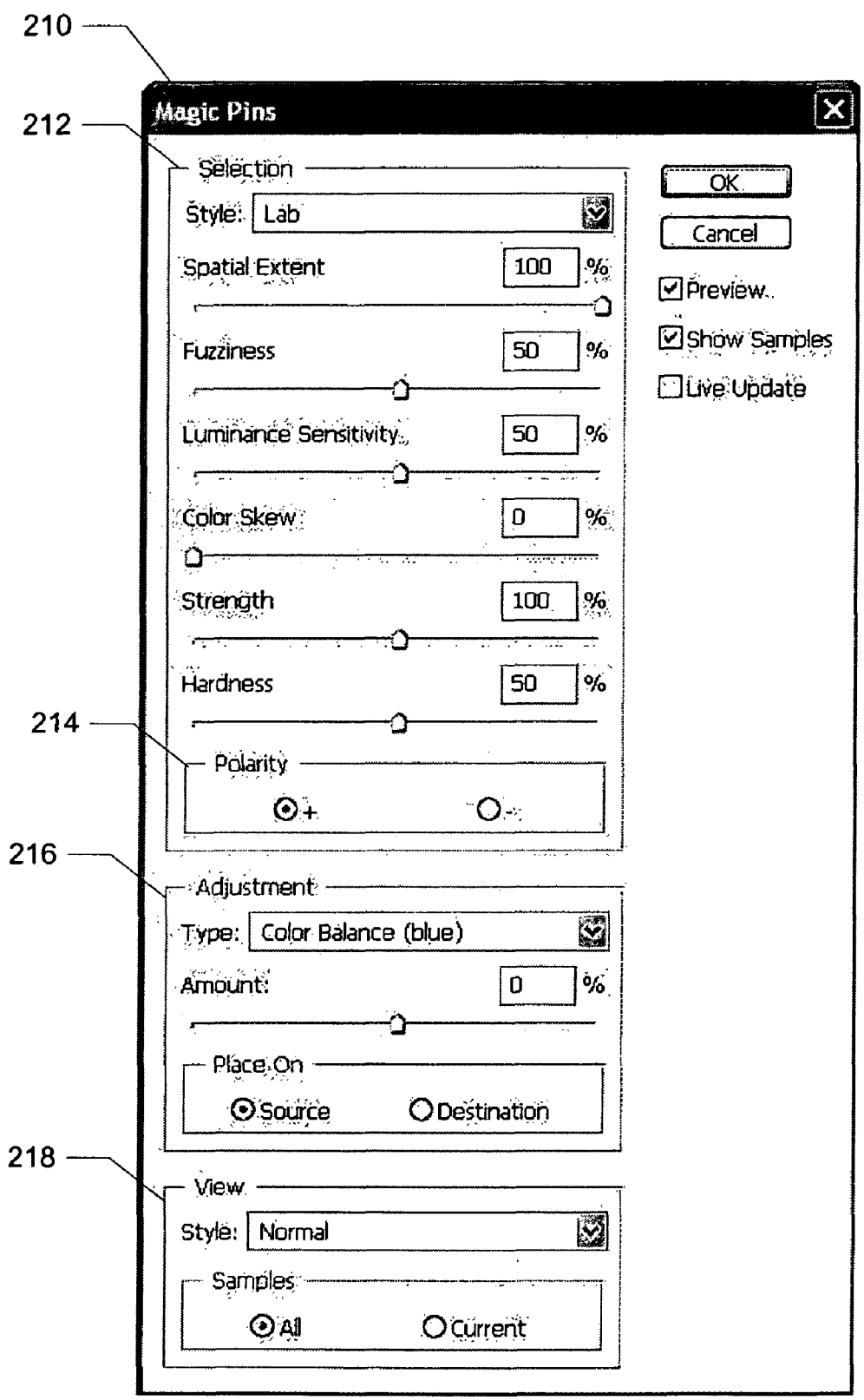
FIG. 8 is a user interface diagram illustrating a modification dialog box, according to an example embodiment of the present invention, which may be provided by an interface component of a digital data activity application so as to enable a user to modify parameters (e.g., selection and activity parameters) associated with a marker.

FIG. 7 is a user interface diagram illustrating an image editor user interface 190, according to an example embodiment, that may be generated by the interface component 122 of the digital image adjustment application 120. The image editor user interface 190 may present various menus (not shown) that allow a user to perform image adjustment (or modification) operations with respect to digital image data 162, a representation 192 of which is displayed within the interface 190. The image editor user interface 190 further presents a user with a selection of image adjustment markers icons 200, which in the example interface are conveniently termed "pins", in a pin collection menu 194. The selection of marker icons 200 represents underlying predefined markers 196, as well as user-defined markers 198.

The menu 194 presents the marker icons 200 together with appropriate descriptor information 202. While the marker icons 200 are shown in FIG. 7 to be uniform, in alternative embodiments the marker icons 200 may vary, depending on the parametrically-controlled selection activity, and/or the parametrically-controlled image adjustment activity, associated with an underlying marker 163. Further, as described above, each of the marker icons 200 may include a graphical "switches" that allow an activity and/or selection mechanism associated with an underlying marker to be positively, negatively or neutrally applied.

The image editor interface 190 conveniently allows a user to "drag-and-drop" a marker icon 200, from within the menu 194, to a location within the image representation 192. In this manner, a user may input location data 170, to be associated with an instantiation of the underlying marker 163, to the image adjustment application 120. Specifically, in an example embodiment, the (x, y) coordinates of the location within the representation at which a user locates a particular marker will be recognized, and stored, by the application 120 as location data 170 (e.g., as a marker origin (r0)).

Upon the location of an appropriate marker icon 200 within the representation 192, the operations described above with respect to blocks 102-110 of FIG. 4 may be automatically and sequentially performed. In other words, the user-input of the location data 170 invokes the image adjustment and region selection (e.g., masking) activities associated with the underlying marker 163. For example, consider that a user may regard the sun image feature 204, as an example of an image feature or object, as being too bright within the representation 192. Accordingly, the user may drag-and-drop the "dull sun" marker icon 200 to identify a location anywhere within the sun image feature 204. Responsive to this "drag-and-drop" event, the image adjustment application 120 will receive as inputs (x, y) coordinates of a location within the sun image feature 204. An image adjustment mechanism (e.g., the brightness mechanism 138) will be automatically be invoked as a result of an association with the underlying "dull sun" marker 163, and will reference an associated selection parameter 184 to globally reduce highlighting across the digital image data 162.

The image adjustment application 120 will then define a selection mask, in accordance with a selection mechanism (e.g., the color-based selection tool 130, such as the coherency module 51). The defined selection mask (e.g., identifying the edges of the sun image feature 204) will then be applied to localize the highlight-reducing effects of the brightness mechanism 138 to the sun image feature 204.

In a similar manner, the user may place the "white cloud" marker icon 200 at any location within a cloud image feature 206 to likewise perform a parametrically-controlled adjustment, the effects of which are parametrically localized to the cloud image feature 206.

Having performed some initial image adjustment operations, in the manner described above, the user may then decide that the localized effect with respect to the sun image feature 204 is not adequate. For example, the sun image feature 204 may still be too bright for the user's liking. Accordingly, the user is now presented with the opportunity of modifying the control parameters associated with the marker 163 located on the sun image feature 204. The image editor user interface 190 enables a user to select a marker icon 200, already located within the representation 192, for example by double clicking on the relevant marker icon 200, responsive to which the image editor user interface 190 invokes a parameter modification dialog box 210. An example of such a dialog box 210 is provided in FIG. 8. This dialog box 210 may also be invoked from other menus (not shown) provided by the image editor user interface 190. As shown, the parameter modification dialog box 210 includes a region selection interface 212, utilizing which a user may modify a selection mechanism choice 182, as well as any one of a number of selection parameters 184 associated with the selection mechanism choice 182. Conveniently, the region selection interface 212 provides sliders that a user may utilize to vary a collection of location data 184. The region selection interface 212 furthermore allows a user, utilizing polarity radio buttons 214, to specify a polarity with which the selection mechanism choice 182 will be applied with respect to the representation 192.

The dialog box 210 further includes an adjustment selection interface 216, utilizing which a user may specify an adjustment mechanism choice 176, and also input an adjustment parameter 178 associated with that choice. Again, a slider is conveniently provided within the selection interface 216 to facilitate input of an adjustment parameter 178.

A view selection interface 218 allows a user to define a view. The choice of view determines the form with which the source data is presented to the user. For image data, the view choices may include 1) the adjusted image data, 2) the selection mask only, presented as an image (in black and white for example), 3) ruby lith, in which the adjusted image data is blended with a ruby red (or other color of the user's choice) constant color according to the strength of the selection mask, 4) a transparency mode in which the adjusted image is blended with transparency squares according to the strength of the selection mask, 5) an opacity mode similar to 4) but using the complement (255—mask) of the selection mask.

It should be noted that, responsive to a modification of the control data 172 utilizing the dialog box 210, the representation 192 will be dynamically, and in near real-time, updated to reflect the effects of the user input provided via the dialog box 210. For example, where a selection type choice 182, or an associated selection parameter 184, is modified, the selection mask defined thereby will be dynamically modified, and the results of that modification dynamically and automatically depicted within the image editor user interface 190. Similarly, where the adjustment mechanism choice 176 or an associated parameter 178 is varied, the effects of these modifications will be dynamically reflected in the representation 192 of the digital image data 162 as displayed by the image editor user interface 190. Accordingly, utilizing the dialog box 210, a user is able to modify the control data 172 until the localized effects of a particular adjustment are to the user's satisfaction.

In addition to modifying the control data 172, for example utilizing the dialog box 210, a user is able to modify the location data 170. For example, a user may relocate a marker icon 200, within the context of the representation 192. Responsive to this relocation, the parametrically localized and parametrically-controlled effects of an adjustment are automatically applied with respect to a new location identified by the re-located marker icon 200. Again, these effects will occur in near-real time, responsive to the relocation event.

Further details regarding specific and example implementations of the selection mask definition and selection mask application operations, as described above with reference to blocks 104 and 108 of FIG. 4, will now be provided. These example implementations are described with respect to parametrically-controlled activities, in the form of image adjustment activities. It will nonetheless be appreciated that the principles of these example implementations may be applied with respect to other parametrically-controlled activities performed with respect to other types of source digital data 14.

As noted above, a parametrically-controlled selection of a selected portion of source digital data 14 is performed utilizing a marker location with respect to the source digital data 14. In one embodiment, the selection is further determined by a set of continuous or discrete selection parameters 74, associated with a selection mechanism, identified by a selection mechanism choice 72. Examples of selection mechanisms that are provided with respect to image data may include a coherency tool (e.g., supported by the coherency module 51), the "Magic Wand" tool, the Color Range tool (with its associated Fuzziness parameter) and the Marquee selection tool (with an associated feather parameter), provided in the ADOBE® PHOTOSHOP® application. Selection parameters 74, such as feather selection strength, feather amount and expansion and contraction amount, can generally be applied to a number of selection mechanisms, while other selection parameters may be specific to an associated selection mechanism. Selection parameters specific to a coherency tool may include a pixel local energy pair, neighbor interaction energies strength, a neighbor interaction color spread, edge softness (e.g., feather) and edge choke.

A method, according to an example embodiment, of selecting a portion of digital data (e.g., image data), as may be performed by the selection mechanism 51 will now be described. At a high level, the example method commences with receiving a first selection location (e.g., a pixel location within the image data) and a selection parameter value (e.g., a radius value) with respect to digital data. A portion of the digital data may then be selected (e.g., a selection mask may be defined) relative to the first selection location. In one embodiment, the selecting may include assigning an energy value to each pixel within a selection proximity of the selection location. The selection proximity may be determined based on the selection parameter, and the energy value may be a function of distance from the selection location.

A selection value may be calculated for each pixel within the selection proximity of the selection location based on (1) the assigned energy value and on (2) a pixel characteristic difference between the relevant pixel and at least one neighboring pixel. The selection value may determine whether the relevant pixel is included in the selected portion of the digital data.

In one embodiment, the pixel characteristic difference comprises a pixel color difference. However, in other embodiments, different pixel characteristic differences may be utilized. For example, quantities determined from associated pixel colors may be associated with each pixel. Examples are edge or gradient values, neighborhood average or median values, or texture measures which are based on statistics of pixel colors in the neighborhood of the given pixel. The selection parameter may be a radius, and the selection proximity may be determined based on the radius. Further, the calculation of the selection value may include calculating a selection value for each pixel within the radius so as to minimize a sum of energies of the pixels within the radius. The minimization of the some of energies of the pixels may be performed utilizing a minimum cut graph methodology, or a maximum graph flow methodology.

In an example embodiment, the selection has a polarity (e.g., positive or negative, foreground or background), and the energy value assigned to each pixel is that least partially based on the polarity of the selection. The selection value may be a binary value (e.g., positive or negative) or a gradient value.

An adjustment parameter, associated with a parametrically-controlled adjustment to be made to the selected portion of the digital data, may be received in an example embodiment. Further, a second selection location may be received, and the portion of the digital data may be selected relative to the first and second selection locations.

In a further example embodiment, multiple selection locations may be received, each selection location having an associated adjustment parameter of a particular adjustment type. A set of selection locations having adjustment parameters of a common type of adjustment may be identified. The portion of the digital data may be selected (e.g., a mask may be defined) relative to the set of selection locations.

Figure 9:
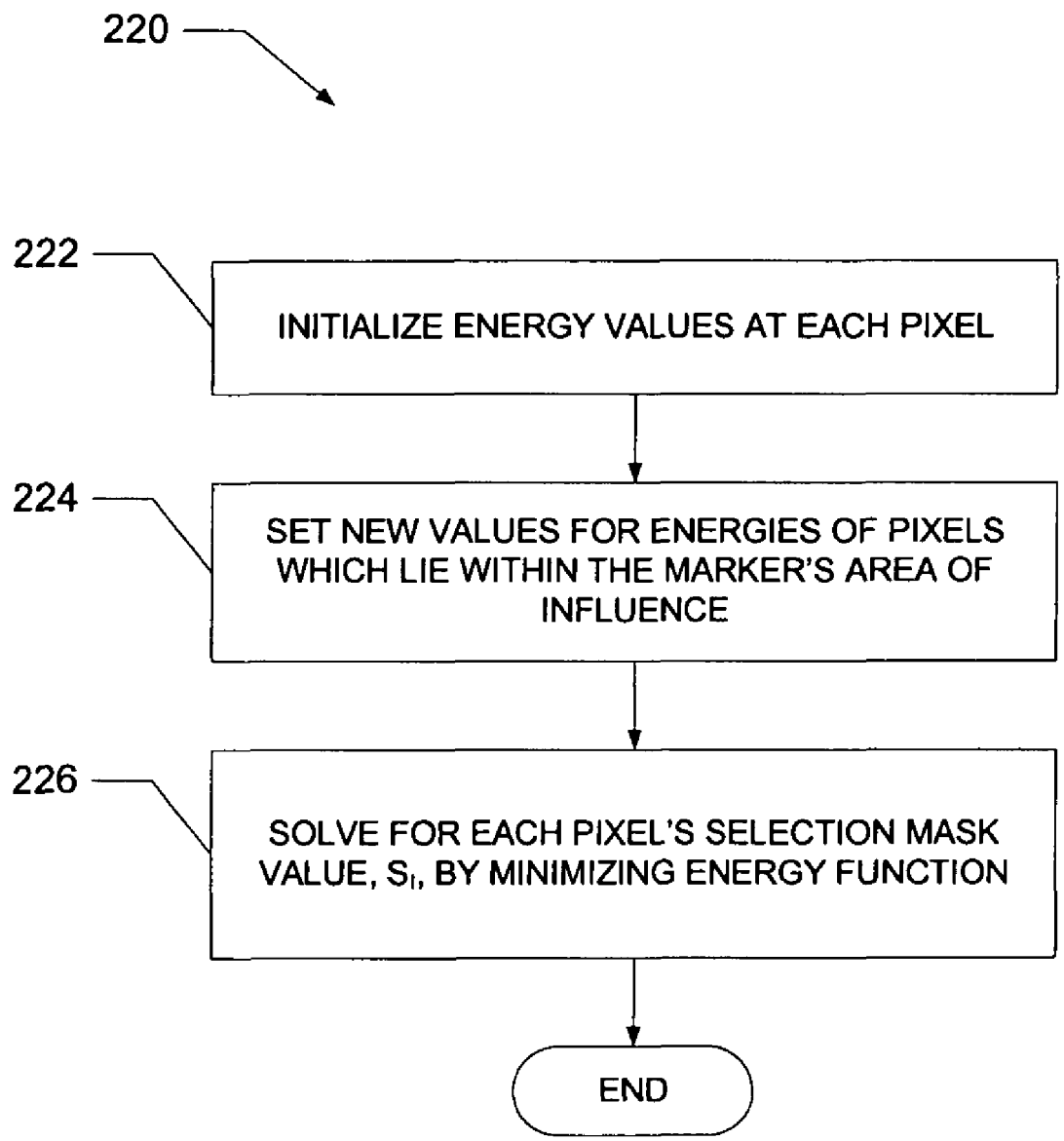
FIG. 9 is a flowchart illustrating a method, according to one example embodiment of the present invention, to generate a selection mask by the combination of a number of spatially restricted selection masks to generate a composite selection mask.

FIG. 9 illustrates a method 220, according to an example embodiment, to produce a selection mask for a specific marker or a set of markers using the coherency module 51.

The coherency module 51 may create an effective selection mask from a set of markers placed on the image. This may be achieved by using each marker to set local energy values for each pixel of the image that lies proximate to the marker location and within an area (e.g. sphere, circle or rectangle) of influence. The image data (e.g., color) values determine a neighbor interaction energy that produces the coherence in the resulting selection. The energy also depends on the selection state of each pixel (e.g., selected or not selected). The selection state may be solved by finding that state which results in the lowest overall energy value. Minimum graph-cut and/or maximum graph flow methods can be used to solve the selection state.

As noted above, each marker, M, contains a set of selection parameters, Ps and a set of image adjustment parameters, Pa. The selection parameters may include a pixel local energy pair, $\square^+_i$ and $\square^-_i$. The letter 'i' is, in the present example, used to label each pixel in the image. A '+' may be used to designate a selected pixel (e.g., foreground pixel) and a '−' to designate a non-selected pixel (e.g., background pixel). The selection parameters may also include neighbor interaction energy strength, v0 and a neighbor interaction color spread. Other selection parameters may include an edge softness (or feather) amount and an edge choke amount. Also included is the marker origin, $r_1$, and radius parameter, R.

A first example embodiment considers a set of markers that are placed on an image and that are all set to produce a common type of image adjustment. The markers may all be "Curve Adjustment" markers or "Color Hue" adjustment markers, for example. Alternatively, the set of markers may all be set to produce no adjustment, and may be used simply to create a selection mask without modifying the image colors. In the example embodiment, there are N such markers, labeled by a=0, 1, . . . N.

The method 220 begins with an initialization module of the coherency module 51 initializing the energy values at each pixel that lays within an area of influence a marker at block 222. Example values may be:

$$\epsilon^+_i = C = 10,$$

$$\epsilon^-_i = 0$$

for each pixel, i. As noted above, values are initialized for each pixel that lies in the area of influence of a marker. This includes the entire image if the area of influence is the entire image. Pixels outside of the area of influence of the markers may not need to be initialized. This may result in faster processing, but may also result in apparent edges at the boundaries of the areas of influence. For each of the N markers, new values are set (e.g., by an energy module of the coherency module 51) at block 224 for energies of pixels which lie within the marker's area of influence (e.g., as determined by its radius R). For a positive polarity marker (e.g., when selecting foreground with a marker), values for energies of pixels may be calculated as follows:

$$\epsilon^+_i = (1-g(r-r_0))C,$$

$$\epsilon^-_i = g(r-r_0)C,$$

For a negative polarity marker (e.g., when selecting background with a marker), values for energies of pixels may be calculated as follows:

$$\epsilon^+_i = g(r-r_0)C,$$

$$\epsilon^-_i = (1-g(r-r_0))C.$$

$g(r-r_0)$ is a decreasing function of distance from the marker origin, $r_0$, and represents a specific marker's spatial profile. An example spatial profile function is:

$$g(r-r_0) = \exp[-(r-r_0)^2/(2R^2)].$$

Having used the markers selection parameters to set the image pixel local energies at block 222, a solve module of the coherency module 51 at block 226 proceeds solve for each pixel's selection mask value, $s_i$, by minimizing the following energy:

$$\text{Energy} = \Sigma_i[(1+s_i)/2\epsilon^+_i + (1-s_i)/2\epsilon^-_i] + 1/2\Sigma_{ij}(1-s_is_j)/2v_{ij}.$$

$v_{ij}$ is the neighbor interaction energy, which is taken to be a decreasing function of the pixel color difference:

$$v_{ij} = v_0\exp(-\gamma(c_i-c_j)^2).$$

Example values for the determining constants may be:

$$v_0 = 50,$$

$$\gamma = 0.5/(\text{colorspread})^2,$$

with typical values for color spread=50, when applied to an 8 bit color image (color values ranging from 0 to 255).

The desired solution is the set of selection mask values which results in the smallest possible value for the total energy.

The above minimization problem may be solved, in one example embodiment, by placing the various energy terms on a graph structure and finding a minimum cut or maximum flow solution for the graph. An alternative solution can be obtained by applying standard gradient descent techniques to solve for a continuous selection mask value.

When structured, each pixel may assigned to foreground ($s_i$=+1) or background ($s_i$=−1) according to which portion of the cut graph the pixel remains attached.

A binary selection mask (e.g., the set of values of $s_i$) can be graded by applying a Gaussian blur to soften the edges and applying adjustments to choke the edges more or less.

In example scenarios in which multiple markers produce different types of adjustments, the coherency module 51 may produce one mask for each type of image adjustment. Consider an example in which there are ten markers on the image that are adjusting contrast, and two additional markers that are controlling color saturation. In this case, the coherency module 51 may produce two selection masks. Each set of markers with its associated adjustment may be indicated as a Marker Layer and treated as separate layers. For example, the layers may be overlaid in various ways, and the adjustments applied to the image sequentially according to the layer stacking order.

An example is now provided that describes use of a color model of opacity to bias the local energies. A single marker may for example be used to modify or select an image object (e.g., a flower). A color model of opacity may be used to seed the local pixel energies. In this example model, the opacity value at a pixel may be estimated as a nonlinear function of the pixel's color values:

$$\text{opacity} = w_0 + \Sigma_a w_{1a}c_a + \Sigma_{a,b}w_{2ab}c_ac_b + \Sigma_{a,b,d}w_{3ab}c_ac_bc_d +$$

The summations are over components of the color at a single pixel. For example, in RGB color space, $c_0$=red, $c_1$=green, $c_2$=blue.

The constants, $w_0$, $w_1$, $w_2$, $w_3$ . . . are weights which determine the function. In the above example, higher powers than cubic in the color components have been omitted, but these may be included as well. An equivalent alternate form for the opacity lends itself more easily to solving for the weights:

$$\text{opacity} = W \cdot X,$$

where W is a vector of weights and X is a vector which consists of all combinations of color components up to some specified power:

$$X=\{1, c_0, c_1, c_2, c_0 c_0, c_0 c_1, c_0 c_2, c_1 c_1, c_1 c_2, c_0 c_2, c_0 c_0 c_0, c_0 c_1 c_0, \ldots\}.$$

The weight vector, W, may be found by using the available markers to identify regions which are desired to be foreground (e.g., positive polarity markers) and have opacity=1 and markers which are desired to be background (e.g., negative polarity markers) and have opacity=0. This may be achieved by minimizing the error function:

$$\text{error} = \tfrac{1}{2}\Sigma_{+,i}(1-W\cdot X_i)^2 + \Sigma_{-,i}(W\cdot X_i)^2,$$

where the first summation is over foreground pixels (e.g., pixels for which the positive polarity marker spatial profile functions are greater than some threshold value) and the second summation is over the background pixels (e.g., those pixels for which the negative polarity marker spatial profile functions are greater than the threshold value). The resultant solution is:

$$W=M^{-1}\cdot\Sigma_{+,i}X_i,$$

where $M^{-1}$ is the inverse of the matrix M, and $$M=\Sigma_{+,i}X_iX_j+\Sigma_{-,i}X_iX_j.$$

Given these constant weights, the opacity at each pixel (labeled by 'i') may be calculated as:

$$\text{opacity}_i = W\cdot X_i.$$

Finally, having found the opacity from this color model, the local pixel energies can be determined as:

$$\epsilon^+_i=\log[1/\text{opacity}_i], \epsilon^-_i=\log[1/(1-\text{opacity}_i)].$$

Figure 10:
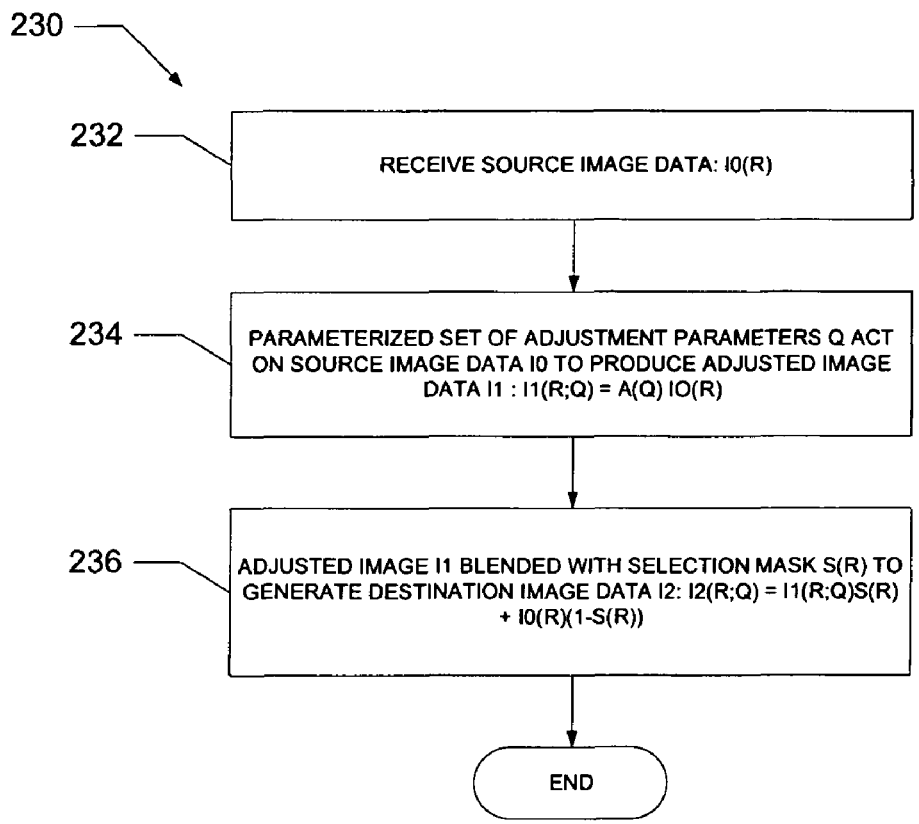
FIG. 10 is flowchart illustrating a method, according to an example embodiment of the present invention, to perform a parametrically-controlled adjustment with respect to source image data, and to apply a selection mask, to generate destination image data.

FIG. 10 is a flowchart illustrating a method 230 according to an example embodiment to perform a parametrically-controlled activity (e.g., an image adjustment) with respect to source data 14, and to apply a selection mask (e.g., defined by the coherency module 51, as described above) to the adjusted data to generate destination data, as described above with reference to blocks 106 and 108 of FIG. 4. For the purposes of discussing the method 230, source image data is designated as I0(r). For color images, I0 will typically consists of several color components or channels, three for RGB or LAB color space, four CMYK, for example. The effect of a marker 163, in the example embodiment, is to produce a new image, namely destination image, I2(r). The method 230 accordingly commences at block 232 with the receipt by the digital image adjustment application 120 of the source image data, I0(r), via the interface component 122, the source image data being received as application data 160 associated with the application 122.

At block 234, a parameterized set of adjustment parameters, q, act on the source image data I0, to produce adjusted image data I1. Specifically, consider that the destination image is produced, in the example embodiment, by application of an image adjustment, as modulated by a selection mask, S(r). The image adjustment, A, parameterized by a set of adjustment parameters, q, acts on the source image data I0 to produce adjusted image data, I1, as follows:

$$I1(r;q)=A(q)I0(r).$$

The image adjustment may, in various embodiments, be a linear or a non-linear operation. An example of a linear adjustment is a channel mixer in which each color channel is derived as a linear combination of source color channels. An example of a non-linear operation is a gamma or contrast adjustment, in which each color channel is non-linearly modified by application of a power law; for example in 8-bit RGB color space with I1 equal symbol (red1, green1, blue1), red1=255*power(red0/255.0,gamma), green1=255*power(green0/255.0,gamma), blue1=255*power(blue0/255.0,gamma), and q=gamma.

Returning to the method 230, at block 236, given the adjusted image, I1(r; q), a blend with the selection mask, S(r) is used to obtain the destination image data I2 according to the following equation:

$$I2(r;q)=I1(r;q)S(r)+I0(r)(1-S(r)).$$

In locations where S equal 0, the destination image data is the same as the source image data. In locations where S equals 1, destination image data is the adjusted image data, I1. For intermediate selections strengths, the destination image data is a blend between the source image data and the adjusted image data. For simplicity in representing a formula, it has been assumed that the selection mask is normalized to range in value between 0 and 1.

The resultant image, I2, is parameterized in terms of both the adjustment parameters, q, as well as the selection parameters, qa, and the selection locations, ra, for all of the associated a markers 163 (a equals 1 ... N).

The above formulation assumes that all of the markers 163 have a common adjustment type and parameter settings. This accordingly justifies the use of a single combined selection mask, S(r). However, as noted above, a collection of markers 163 may be associated with a specific adjustment layer 165. Multiple adjustment layers 165 may be "stacked" on top of each other, each one potentially applying different adjustments. In this scenario, adjustment layer technology, included within a digital image adjustment application 120 may be utilized to blend together the effects of each of the adjustment layers 165.

With respect to FIG. 7, a user interface 190 has been described in which the marker icons 200 have been placed on top of (or overlaid on) an image. Each of a number of markers 163 may have a different associated marker icon 200 depending on the nature of the adjustment, and an adjustment layer 165 in which the relevant marker 163 resides. For example, markers 163 that implement "curves" adjustments may be represented by a special curve-shape marker icon 200, while brightness adjustments may be represented by different marker icons 200. Further, each of the markers 163 that reside in a specific (e.g., a first) adjustment layer 165 may be colored a common color (e.g., red), while those markers 163 that reside in another layer may all be colored a different common color. When a user, utilizing the interface 190, selects a specific adjustment layer 165, the marker icons 200, representing markers 163 associated with the selected adjustment layer 165, may be visible (or otherwise visually distinguished by highlighting, for example), whereas marker icons 200 associated with markers 163 in non-selected adjustment layers 165 may be hidden. Further, when a user selects a specific marker icon 200 on an image representation 192, the associated adjustment layer 165 may be automatically highlighted and selected.

Figure 11:
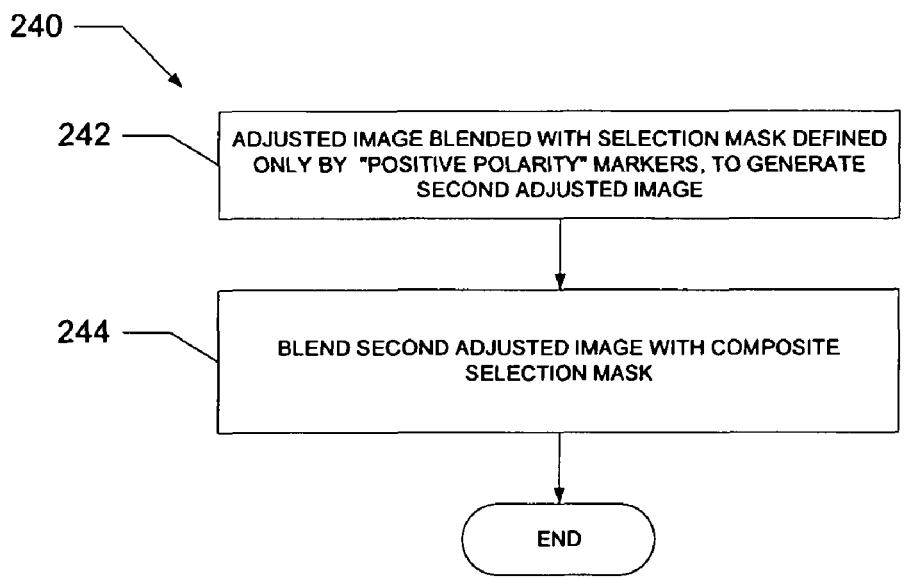
FIG. 11 is a flowchart illustrating a method, according to an example embodiment of the present invention, to perform an image adjustment activity utilizing a number of selection masks, some of which have a negative polarity associated therewith.

FIG. 11 illustrates a method 240, according to an alternative example embodiment, to adjust a source image data. Whereas the method 230, discussed above, may be performed in the context of an adjustment layer model, the method 240 assumes a so-called "multiple adjustments" model. Specifically, in an alternative embodiment, each of the markers 163 may have an arbitrary associated adjustment type and parameter value. This is conceptually equivalent to an approach in which one marker 163 is allowed per adjustment layer 165 but the composition of each of the adjustment layers 165 is explicitly described. As described above with reference to FIG. 7, the example image interface 190 allows multiple markers 163 to be located with respect to an image representation 192. As also described above with reference to FIG. 7, when a particular marker icon 200 is selected, the associated selection and adjustment parameters may be displayed, for example utilizing the parameter modification display. In one embodiment, these selection and adjustment parameters may simply be displayed in a "pop-up" box adjacent to the selected marker icon 200. Alternatively, the associated selection and adjustment parameters may be displayed within the context of the above-described parameter modification dialog box 210, which allows for the modification of the selection and adjustment parameters. In the "multiple adjustments" model, all of the selection and adjustment parameters may vary from a marker 163 to a marker 163, and there is no requirement regarding uniformity of such parameters. Returning to block 242 of the method 240, one approach to blending pins within the "multiple adjustments" model is to perform a blending of an adjusted image data with a selection mask defined only by "positive polarity" markers 163, to thereby generate second, or intermediate, adjusted image data. Specifically, an approach to blending the markers 163 is provided below:

```
// Blend the image adjustments for each Magic Pin, as long as its polarity
is positive:
Initialize I(r) to I0(r), the source image, everywhere
For (a = 1; a <= N; ++a)
If (ea = +1)
{
I(r) = A (qa) I(r) S(r; ra, pa) + I(r) (1 – S(r; ra, pa)).
}
// Finally, blend the resultant image with the combined selection mask:
I2(r) = I(r) S(r) + I0(r) (1 – S(r)).]
```

At block 244, the blended second adjusted image data is then blended with a composite selection mask, which incorporates the effect of "negative polarity" markers to thereby block certain image adjustments.

In an alternative embodiment, an approach may be adopted in which the effect of all "positive polarity" markers 163 are first blended with an adjusted image data, and thereafter, resulting second, or "intermediate", adjusted image data is blended with source image data, utilizing the masks defined by the "negative polarity" markers 163.

```
// Blend the image adjustments for each marker, applying
negative markers last.
Initialize I(r) to I0(r), the source image, everywhere
For (a = 1; a <= N; ++a)
If (ea = +1)
{
I(r) = A (qa) I(r) S(r; ra, pa) + I(r) (1 – S(r; ra, pa)).
}
For (a = 1; a <= N; ++a)
If (ea = –1)
{I(r) = I0(r) S(r; ra, pa) + I(r) (1 – S(r; ra, pa)).}
I2(r) = I(r).
```

As also mentioned above, the selection induced by each marker 163 depends on the associated selection parameters, as well as the image data at the marker location, identified by the location data 18. The image data at the marker location may include image color and pixel location. In addition, it may incorporate image data from the vicinity of the pixel location, such as that from a local neighborhood of pixels or gradient information. The selection associated with a marker 163 may, in one example embodiment, be further refined by allowing a user to identify multiple marker locations to be included in the location data 18, associated with a particular marker 163. In one embodiment, this may be achieved by allowing a user to select a marker icon 200, for example such as that mentioned in FIG. 7, and to enabler the user to "scrub" (e.g., moving in a user-targeted area) the marker icon 200 or a cursor, utilizing a mouse for example, over a region of foreground pixels to provide additional information in the vicinity of an initial marker location. Optionally, the user may be enabled to designate a background region, for example by holding down a modifier key or by checking an appropriate check box within a user interface. Thereafter the user may be enabled to "scrub" the marker icon 200 over the background region.

The net result is that the user has allowed the digital image adjustment application 120 to accumulate a set of foreground points, rf, and a set of background points, rb. These "marker locations" may then be utilized by an appropriate selection mechanism, associated with a marker 163, to provide a more accurate selection mask, which better reflects a user's intent. In one embodiment, a single marker location is registered, but the user provides additional information through scrubbing in the vicinity of the marker location. In another embodiment, scrubbing may be utilized to identify a set of marker locations. In one embodiment, the colors at these multiple marker locations may be utilized, in addition to the pixel locations. Further, a neighborhood of color may be collected from the vicinity of each of these marker locations.

Continuing the example of the user foreground and background marker locations (or "points"), the application 120 may, in one embodiment, consider "color distance" between two points in LAB color space by examining each color axis independently. Along each axis there is a lower bound and an upper bound for the allowed value differences for which the selection masks in non-zero. Utilizing the foreground points, the minimum and maximum values may be calculated for each color axis component, and these values may then be utilized in a color selection algorithm (e.g., of a color selection mechanism color-based selection tool 130). Further, the range of values from the background points may optionally be used to subtract from this range. For example, if the foreground points have a range from LFmin to Lfmax, for the luminescence channel, and the background points have a range from LBmin to LBmax, it is possible to take:

```
If (LFmin < LBmin < LFmax)
{Lmin = LFmin; Lmax = LBmin;}
else
If (LFmin < LBmax < LFmax)
{Lmin = LBmax; Lmax = LFmax;}
Else
{Lmin = LFmin; Lmax = LFmax}
```

In this manner, the foreground points determine the base range of the selection criterion, and the background points degrade at this selection range.

In an alternative embodiment, the foreground points are modeled by a Gaussian distribution in color space, and the background points by another Gaussian distribution. The foreground points can be utilized to calculate a foreground color correlation matrix, Mf with components:

$$Mfij=<(c-<c>)i(c-<c>)j>f,$$

where $<\ldots>f$ indicates an average over all of the foreground points.
Similarly, for the background point, $$Mbij=<(c-<c>)i(c-<c>)j>b,$$

where $<\ldots>b$ indicates an average over all of the background points.
Then the selection mask can be defined as:

$$S(r)=1/(1+k\text{ ratio}),$$

where ratio=exp[(c(r)−<c>f) Nf(c(r)−<c>f)−(c(r)−<c>b) Nb(c(r)−<c>b)] and
Nf=½ Mf inverse,
Nb=½ Mb inverse.

k is a constant that may vary from 0 to 1000. If there are no background points available, we may take Nb=0.

While the discussion of an example embodiment of a digital data activity application 40, provided above with reference to FIGS. 5-11, has focused on an example digital image adjustment application 120, which performs adjustment activities with respect to digital image data, embodiments of the present invention may find application in performing an activity (e.g., tracking, sensing, responding and interacting activities) with respect to other types of digital data. For example, coherency may be used for audio or text data. The method used for image pixels can be applied directly to these other data types by defining an appropriate measure of "distance" between two data items. For audio data, the distance measure can be based on the difference in frequency content of the two samples, merely for example. A distance measure may also, for example, be determined by a weighted difference of loudness, pitch, brightness and bandwidth. For text data, the distance measure may include the pairwise frequency of co-occurrence of two words in a text corpus. An example of distance measure for text data may also include measures of semantic similarity between words or between collections of words.

Figure 12:
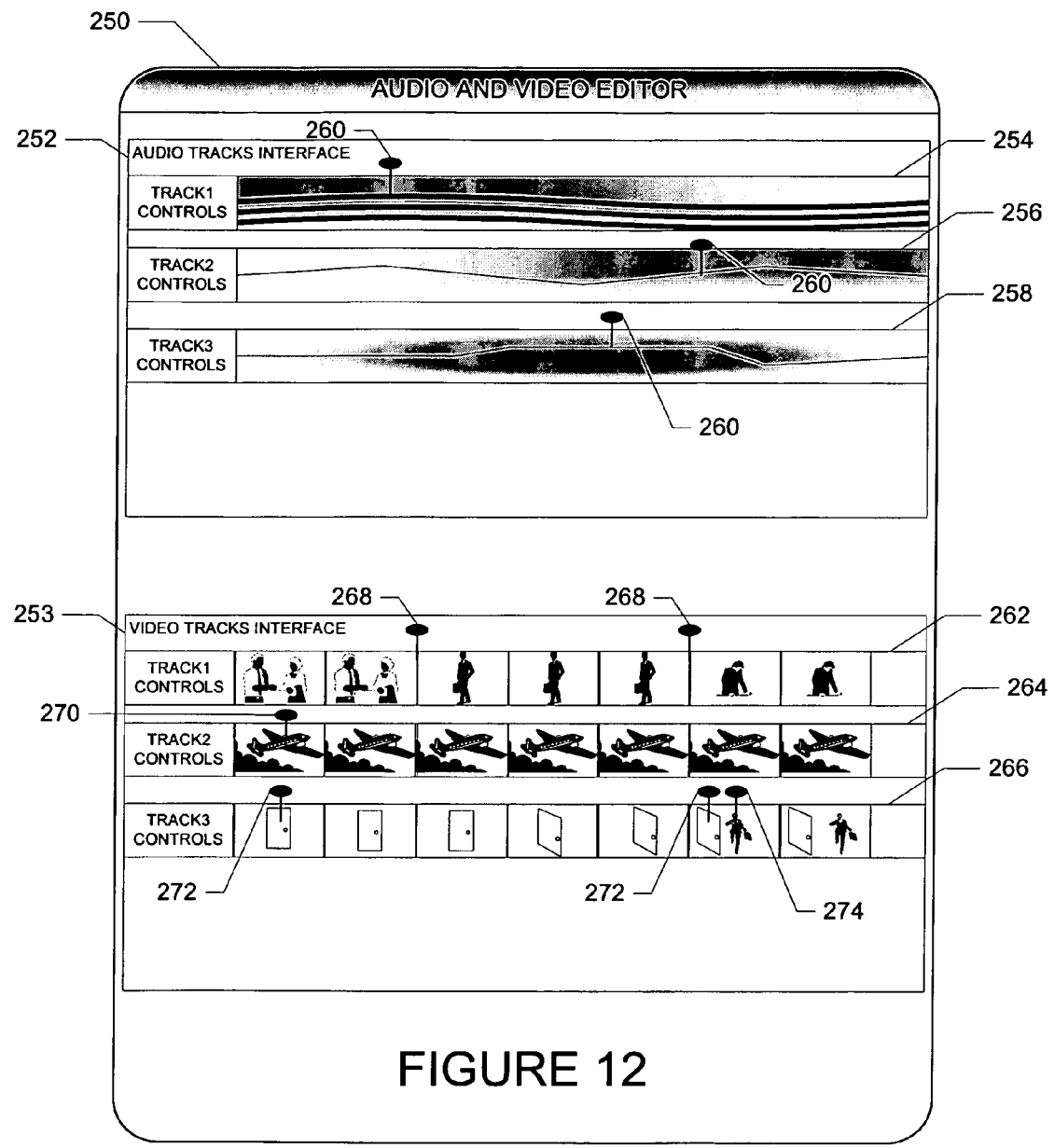
FIG. 12 is a user interface diagram, illustrating an audio and video editing user interface, and illustrates how an example embodiment of the present invention may be utilized to perform activities in a localized manner with respect to parametrically selected portions of the audio/video data.

FIG. 12 is a user interface diagram illustrating an example audio and video editor user interface 250, which may be generated by an activity application, in the example form of an audio and video editor application. The interface 250, for example, includes an audio track interface 252 and a video track interface 253. Dealing first with the audio track interface 252, visual representations 254-258 are provided for each of three audio tracks. Marker icons 260 are shown to be located with respect to each of the audio tracks and may, as described above, operate to enable parametrically-localized, and parametrically-controlled, activities with respect to each of the represented audio tracks. For example, an underlying marker 16, associated with a particular marker icon 260, may adjust the volume, tone etc. of a particular audio track in a localized manner that may be time-based, or frequency range-based.

Turning to the video track interface 253, representation 262-266 for each of three video tracks are displayed within the video track interface 253, and marker icons, associated with underlying markers 16, are similarly located with respect to the representations 262-266. Again, the markers 16 may perform parametrically-localized, and parametrically-controlled, activities with respect to each of the represented video tracks. A discussion of example activities that may be performed with respect to each of the video tracks, by the associated marker 16, has been provided above with reference to FIG. 3.

For example, markers, represented by marker icons 268, that automatically detect scene changes within a video track are shown to be located with respect to a first video track representation 262. A marker, represented by a marker icon 270, that tracks the movement of an image object or feature through a succession of frames, and that applies an image adjustment with respect to the tracked image feature, is shown to be applied to a second video track representation 264. With respect to a third video track representation 266, a marker 16, associated with the marker icon 272, performs a sensing operation with respect to a door feature, and may invoke a responding mechanism when a sensing mechanism detects that the door has been opened. The marker 16, automatically and without user intervention, then instantiates a second marker 16, represented by the marker icon 274, having associated sensing and tracking mechanisms to monitor an image feature representing a person that has entered a building via the open door.

Dealing now in further detail with an example embodiment in which the source data 14 comprises audio data with reference to the audio track interface 252, it will be noted that a marker icon 260 can be located on a representation of an audio track in order simultaneously to select a portion of the relevant audio track and to perform a modification with respect thereto. Specifically, the marker icon 260 may be placed at a specific point in time on the track, and may perform an activity that only affects the relevant track. In an alternative embodiment, a marker icon 260 may be placed on a single track, and may invoke associated mechanisms automatically to select and modify further audio tracks, such as the case where multiple tracks are combined together to produce a single track. In the audio data example, a marker 16 may include as its selection properties time localization, frequency range, and amplitude or frequency pattern, for example.

Time localization may be incorporated by a function of time, which is centered on a time, t0, at which the marker icon 260 is placed, the function decreasing monotonically for times differing from this value. Such an example function is:

$$s(t)=\exp(-(t-t0)^2).$$

Frequency range selection may, in one embodiment, be accomplished by taking a small window in time, centered about a time step, and performing a Fourier transform (e.g., a Discrete Fast Fourier Transform). In this way, the underlying audio data may be decomposed into strengths in a set of frequency bins, for each point in time. A selection process may then select frequency, f, with a strength centered on a selected frequency component f0, which decreases for different components. An example of such a function is:

$$s(f)=\exp(-(f-f0)^2)$$

As noted above, selection may, in a further embodiment, also focus on a pattern of frequencies or audio amplitudes. Where a frequency distribution of a particular prototype sound portion is represented as pf, which specifies a fraction of sound samples that lie within a frequency bin f (e.g., frequencies which lie between frequency f and frequency f+df, where df is the frequency bin width) then a selection function may be defined as follows:

$$S(f)=\text{Sum}_a\{pfa\exp(-(f-f_a)^2)\}$$

This weighted summation of individual frequency selections produces a selection for audio signals similar to the prototype patterns.

Adjustment that may, in an example embodiment, be made responsive to association of a marker 16 with a location in audio data may be one of many types. For example, a common adjustment is a filtering operation carried out either in the amplitude signal, or the Fourier transformed frequency signal. One example of such a filtering operation is described in the following publication: *IEEE TRANSACTIONS ON SIGNAL PROCESSING*, VOL. 45, NO. 6, PP. 1415(1427, JUNE 1997. *On Fast FIR Filters Implemented as Tail-Canceling IIR Filters*, Avery Wang, Julius O. Smith III The filtering may amplify and/or suppress various frequency components. Alternatively, the filtering may stretch or synchronize the audio signal in time. The filtering may also, in another embodiment, change the "voicing" or timbre of the sound. Alternatively, an activity may be a substitution activity, where the marker 16 substitutes one portion of sounds for another.

Figure 13:
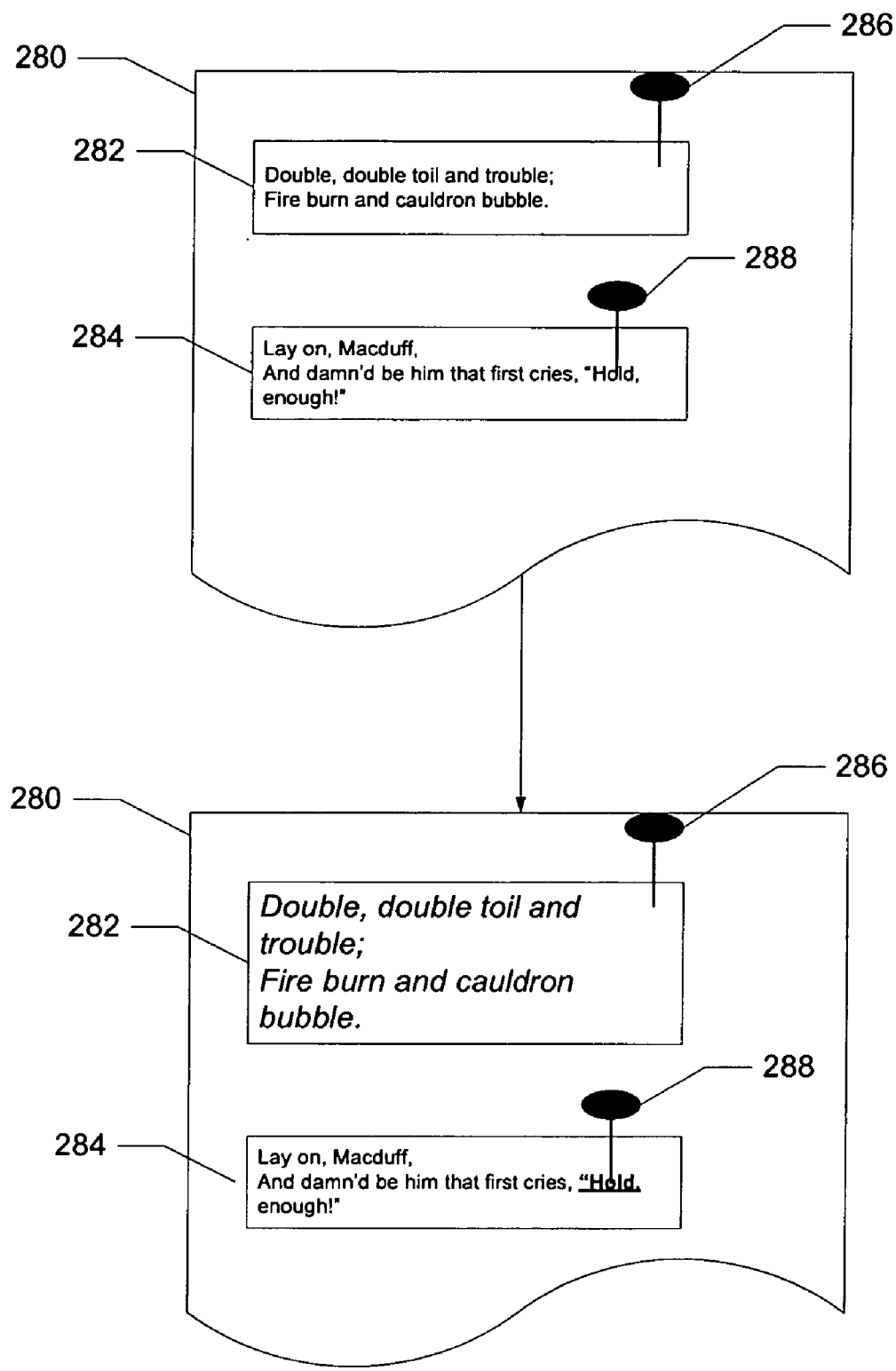
FIG. 13 is a diagrammatic representation of a text document, and illustrates how an example embodiment of the present invention may be utilized to perform a formatting activity, in a localized manner, with respect to a parametrically selected portion of the text document.

In yet a further example embodiment of the present invention, the digital image adjustment application 120 may be a document editing application (e.g., MS WORD developed by Microsoft Corporation of Redmond, Wash. State). To this end, FIG. 13 illustrates example source data 14 in the form of a text document 280, which includes two text portions 282 and 284. Marker icons 286 and 288, each associated with a respective underlying marker 16, are shown to have been located with respect to the text portions 282 and 284. The marker 16 associated with the marker icon 286, in the example embodiment, includes a selection mechanism, and appropriate selection parameters, to configure the marker to perform a paragraph selection.

The user need not locate a marker icon 286 directly on a specific text element (e.g., word, sentence or paragraph) for the selection of that text element. Indeed, the selection mechanism, associated a marker underlying a marker icon 286, may operate to detect a text element in the vicinity of a marker location. The selected text element is then automatically highlighted, or otherwise visually differentiated, to indicate the text element selection that has been performed. This visual differentiation provides feedback to the user regarding the text element that has been selected. The selection mechanism may be configured to select any one of a number of text elements types (e.g., words, sentences or paragraphs), and the marker accordingly provides a quick and efficient mechanism for the selection of a text element with respect to which an activity may be performed.

Further, an adjustment mechanism, and associated control parameters, causes a text editing application to increase the font size of the selected paragraph to a predetermined size.

Similarly, a marker 16 underlying the marker icon 288 is configured, by an appropriate selection mechanism and control parameter, to select a single word at, or adjacent, to the marker icon 288, and to perform a format conversion with respect to that word (e.g., to convert the word to a hypertext link identifying a predetermined (or dynamically determined) resource location). In this example, the word "hold" is shown to be reformatted as a hypertext link and, for example, to be associated with a URL that points to a dictionary application residing on the Internet.

Considering other document types, rendered web pages may change content from day to day. Taking the New York Times website as an example, assuming the user is interested in determining whenever there is a new travel article published on the website. In this case, the user may be presented, for example by a browser application, with a marker icon, representing an underlying tracking marker 16, which allows user location on a specific word (e.g., "travel") appearing at a specific location on a website served up from the New York Times website. The example marker 16 is designated, utilizing an appropriate sensing mechanism and tracking mechanism, to track this word (e.g., to search for this word in the vicinity of the marker location to allow for variations in its placement). The marker 16 is also designated, by an appropriate responding mechanism and associated control parameter, to respond whenever the text beneath the relevant word changes. Accordingly, the marker 16 may be regarded as an intelligent agent that is dependent on rendered text. For example, in this example, the marker 16 would ignore the word "travel" which might occur in other parts of the rendered web page.

Figure 14:
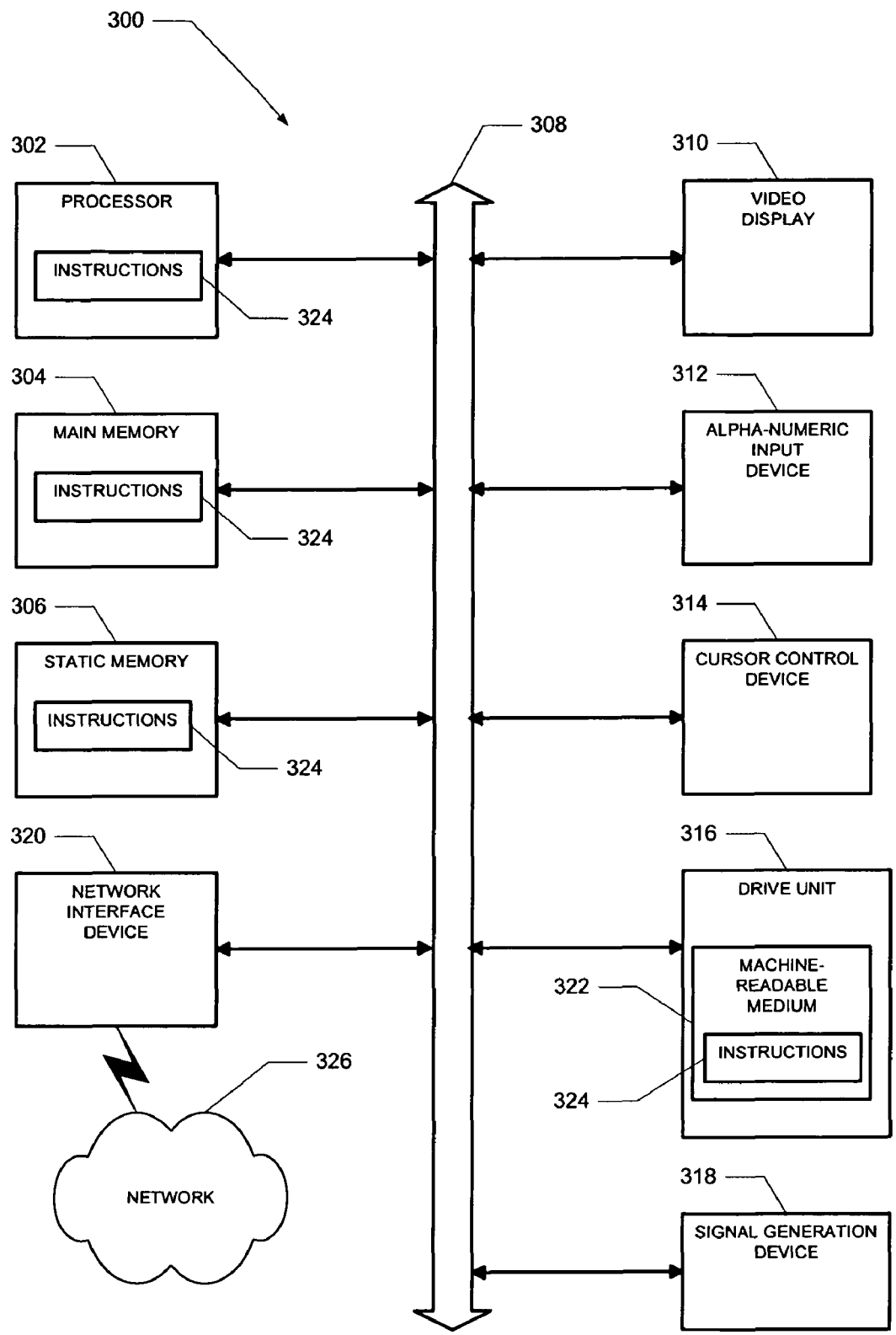
FIG. 14 is a block diagram illustrating a machine, in the example form of a computer system, to execute a set of instructions, thereby to cause the machine to perform any one of the example methodologies described herein.

FIG. 14 shows a diagrammatic representation of machine in the example form of a computer system 300 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, an embedded system or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to included, but not be limited to, solid-state memories, optical and magnetic media, and carrier wave signals.

Thus, a method and a system to perform a selection with respect to digital data have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
receiving a selection location with respect to digital data, the selection location being a revised location of a marker for the digital data, the marker having an initial location distinct from the revised location, the marker having an image adjustment type that corresponds to at least one portion selection parameter; and
selecting a portion of the digital data, the portion surrounding the initial location and the revised location, the selecting being performed by a processor of a machine and including:
determining a selection proximity based on the initial location, on the revised location, and on the at least one portion selection parameter that corresponds to the image adjustment type;
assigning an energy value to a pixel within the selection proximity, the energy value being based on a distance between the pixel and the initial location; and
calculating a selection value of the pixel, the calculating of the selection value being based on the assigned energy value and on a pixel characteristic difference between the pixel and a further pixel at the initial location,
the selection value indicating that the pixel is included in the portion of the digital data.

2. The method of claim 1, wherein the pixel characteristic difference comprises a pixel color difference.

3. The method of claim 1, wherein the at least one portion selection parameter includes a radius, and the selection proximity is determined based on the radius.

4. The method of claim 3, wherein the calculation of the selection value includes calculating a selection value for each pixel within the radius so as to minimize a sum of energy values of the pixels within the radius.

5. The method of claim 1, wherein the at least one portion selection parameter indicates a predetermined area that corresponds to the image adjustment type, the assigning of the energy value being responsive to presence of the pixel within the predetermined area that corresponds to the image adjustment type.

6. The method of claim 1, wherein the selection value is a binary value.

7. The method of claim 1, wherein the selection value is a gradient value.

8. The method of claim 1, including receiving an adjustment parameter associated with a parametrically-controlled adjustment to be made to the selected portion of the digital data.

9. The method of claim 1, wherein the selection location is representative of movement of the marker from the initial location.

10. The method of claim 1, including:
receiving a plurality of selection locations, each selection location having an associated adjustment parameter having a type of adjustment;
identifying a set of selection locations having adjustment parameters having a common type of adjustment; and
selecting the portion of the digital data relative to the set of selection locations.

11. The method of claim 1 further comprising:
modifying the selected portion of the digital data according to the image adjustment type that corresponds to the at least one portion selection parameter.

12. The method of claim 11, wherein:
the modifying of the selected portion has no effect upon a remainder of the digital data outside of the selected portion of the digital data.

13. A system comprising:
an interface component to receive a selection location with respect to digital data, the selection location being a revised location of a marker for the digital data, the marker having an initial location distinct from the revised location, the marker having an image adjustment type that corresponds to at least one portion selection parameter; and
a processor configured by a selection component to create a selection mask for the digital data, the selection mask surrounding the initial location and the revised location, the creation of the selection mask including:
determining a selection proximity based on the initial location, on the revised location, and on the at least one portion selection parameter that corresponds to the image adjustment type;
assigning an energy value to a pixel within the selection proximity, the energy value being based on a distance between the pixel and the initial location; and
calculating a selection value of the pixel, the selection value being calculated based on the assigned energy value and on a pixel characteristic difference between the pixel and a further pixel at the initial location,
the selection value indicating that the pixel is included in the selection mask of the digital data.

14. The system of claim 13, wherein the pixel characteristic difference comprises a pixel color difference.

15. The system of claim 13, wherein the at least one portion selection parameter includes a radius, and the selection proximity is determined based on the radius.

16. The system of claim 15, wherein the calculation of the selection value includes calculating a selection value for each pixel within the radius so as to minimize a sum of energy values of the pixels within the radius.

17. The system of claim 13, wherein the at least one portion selection parameter indicates a predetermined area that corresponds to the image adjustment type, the assigning of the energy value responsive to presence of the pixel within the predetermined area that corresponds to the image adjustment type.

18. The system of claim 13, including an adjustment component and wherein the interface component is to receive at least one adjustment parameter associative the selection location, the adjustment parameter associated with a parametrically-controlled adjustment to be made by the adjustment component using the selection mask of the digital data.

19. The system of claim 13, wherein the selection location is representative of movement of the marker from the initial location.

20. The system of claim 13, wherein the interface component is to receive a plurality of selection locations, each selection location having an associated adjustment parameter identifying a type of adjustment, to identify a set of selection locations having adjustment parameters, and to identify a common type of adjustment; and wherein the selection component is to define the mask for the digital data relative to the set of selection locations.

21. A non-transitory machine-readable medium storing instructions that, when executed by a machine, cause the machine to perform operations comprising:
  receiving a selection location with respect to digital data, the selection location being a revised location of a marker for the digital data, the marker having an initial location distinct from the revised location, the marker having an image adjustment type that corresponds to at least one portion selection parameter; and
  selecting a portion of digital data, the portion surrounding the initial location and the revised location within the digital data, the selecting including:
    determining a selection proximity based on the initial location, on the revised location, and on the at least one portion selection parameter that corresponds to the image adjustment type;
    assigning an energy value to a pixel within the selection proximity, the energy value being based on a distance between the pixel and the initial location; and
    calculating a selection value of the pixel based on the assigned energy value and on a pixel characteristic difference between the pixel and a further pixel at the initial location,
      the selection value indicating that the pixel is included in the portion of the digital data.

* * * * *